United States Patent
Bratton et al.

(10) Patent No.: US 9,636,657 B2
(45) Date of Patent: May 2, 2017

(54) HYDRAULICALLY SET CEMENT BODY FOR PRESERVATION OF ORGANIC LIQUIDS

(71) Applicants: Graham John Bratton, Kent (GB); Kenneth George Mannering, Oxford (GB); Roger Leslie Brown, London (GB); Neil McNeill Alford, London (GB)

(72) Inventors: Graham John Bratton, Kent (GB); Kenneth George Mannering, Oxford (GB); Roger Leslie Brown, London (GB); Neil McNeill Alford, London (GB)

(73) Assignee: BBM Technology Ltd, London (GB)

( * ) Notice: Subject to any disclaimer, the term of this patent is extended or adjusted under 35 U.S.C. 154(b) by 747 days.

(21) Appl. No.: 13/661,789

(22) Filed: Oct. 26, 2012

(65) Prior Publication Data

US 2013/0112607 A1    May 9, 2013

Related U.S. Application Data

(63) Continuation-in-part of application No. 12/452,984, filed as application No. PCT/GB2008/050659 on Aug. 4, 2008, now Pat. No. 8,389,037.

(30) Foreign Application Priority Data

Aug. 3, 2007 (GB) .................................. 0715096.4

(51) Int. Cl.
    *B01J 20/02* (2006.01)
    *C04B 28/04* (2006.01)
    (Continued)

(52) U.S. Cl.
    CPC ................ *B01J 20/02* (2013.01); *A23D 9/00* (2013.01); *B01J 20/2805* (2013.01);
    (Continued)

(58) Field of Classification Search
    CPC .. B01J 20/02; B01J 20/2805; B01J 20/28042; C04B 2111/802; C04B 2111/00284; C04B 38/00; C04B 28/04; B32B 1/02
    See application file for complete search history.

(56) References Cited

U.S. PATENT DOCUMENTS

| 1,851,203 A | 3/1932 | Moreton |
| 3,862,054 A | 1/1975 | Sokolsky |

(Continued)

FOREIGN PATENT DOCUMENTS

| GB | 2006729 A | 5/1979 | |
| GB | WO 2008015481 A2 * | 2/2008 | ............... C11B 3/10 |

(Continued)

OTHER PUBLICATIONS

"U.S. Appl. No. 12/452,984, Non Final Office Action mailed Jul. 6, 2012", 10 pgs.

(Continued)

*Primary Examiner* — Viren Thakur
(74) *Attorney, Agent, or Firm* — Schwegman Lundberg & Woessner, P.A.

(57) ABSTRACT

An hydraulically set oil-permeable cement body is provided in the form of a stand-alone block or briquette for preserving cooking oil during deep fat frying, said body. It has substantially no free water or having a low free water content for resisting damage on immersion in cooking oil and initial heating and is enclosed in packaging that resists ingress of water or water vapor The block or briquette consists of >50 wt % of a mixture of milled white OPC clinker and white OPC, optionally silica 1-2 wt % and/or titania ($TiO_2$) 1-2 wt (Continued)

% and optionally further ingredients selected from calcium silicate, magnesium silicate, aluminum silicate, natural feldspars, natural sodium zeolites, natural calcium zeolites, synthetic sodium zeolites, synthetic calcium zeolites, wollastonite, calcium hydroxide, clays, pillared clays, activated clays/earths, talcs/kaolinite, amphiboles, granite porphyry, rhyolite, agalmatolite, porphyry, attapulgite and diatomaceous earth. It has the properties that calcium and magnesium substantially do not leach into the oil and that it is porous so that oil can diffuse into it and contaminants can be deposited on and within it.

12 Claims, 9 Drawing Sheets

(51) Int. Cl.
  *B01J 20/28* (2006.01)
  *A23D 9/00* (2006.01)
  *C04B 111/00* (2006.01)
  *C04B 111/80* (2006.01)

(52) U.S. Cl.
  CPC ......... *B01J 20/28042* (2013.01); *C04B 28/04* (2013.01); *C04B 2111/00284* (2013.01); *C04B 2111/802* (2013.01)

(56) References Cited

U.S. PATENT DOCUMENTS

| | | | |
|---|---|---|---|
| 3,947,602 | A | 3/1976 | Clewell, Jr. et al. |
| 4,112,129 | A | 9/1978 | Duensing et al. |
| 4,330,564 | A | 5/1982 | Friedman |
| 4,681,768 | A | 7/1987 | Mulflur et al. |
| 4,764,384 | A | 8/1988 | Gyann |
| 4,880,652 | A | 11/1989 | Regutti |
| 4,985,080 | A * | 1/1991 | Jung .................. 106/672 |
| 5,354,570 | A | 10/1994 | Friedman |
| 5,355,776 | A | 10/1994 | Driskill |
| 5,391,385 | A | 2/1995 | Seybold |
| 6,505,546 | B1 | 1/2003 | Koether et al. |
| 8,389,037 | B2 | 3/2013 | Bratton et al. |
| 2005/0223909 | A1 | 10/2005 | Kuratu |
| 2007/0154603 | A1 | 7/2007 | Withiam |
| 2011/0250330 | A1 | 10/2011 | Bratton et al. |

FOREIGN PATENT DOCUMENTS

| | | | | |
|---|---|---|---|---|
| GB | WO 2009019512 A1 * | 2/2009 | ............ | C04B 28/04 |
| JP | 7-148073 A | 6/1995 | | |
| WO | WO-9111914 A1 | 8/1991 | | |
| WO | WO-9854275 A2 | 12/1998 | | |
| WO | WO-02066587 A1 | 8/2002 | | |
| WO | WO-2008015481 A2 | 2/2008 | | |

OTHER PUBLICATIONS

"U.S. Appl. No. 12/452,984, Response filed Sep. 20, 2012 to Non Final Office Action mailed Jul. 6, 2012", 8 pgs.
"U.S. Appl. No. 12/452,984, Response filed Jun. 1, 2012 to Restriction Requirement mailed May 3, 2012", 5 pgs.
"U.S. Appl. No. 12/452,984, Restrcition Requirement mailed May 3, 2012", 5 pgs.
"International Application Serial No. PCT/GB2008/050659, International issued Feb. 9, 2010", 8 pgs.
"International Application Serial No. PCT/GB2008/050659, International Search Report mailed Dec. 3, 2008", 3 pgs.
Grootveld, M., et al., "Warning: thermally-stressed polyunsaturates are damaging to health", Food Chemistry, 67, (1999), 211-213.
Guillen, M. D., et al., "Detection of Primary and Secondary Oxidation Products by Fourier Transform Infrared Spectroscopy (FTIR) and 1H Nuclear Magnetic Resonance (NMR) in Sunflower Oil during Storage", J. Agric. Food Chem., 55(26), (Abstract Only), (2007), 1 pg.
Guillen, M. D., et al., "Oxidation process of oils with high content of linoleic acyl groups and formation of toxic hydroperoxy- and hydroxyalkenals. A study by 1H nuclear magnetic resonance", Journal of the Science of Food and Agriculture, 85(14), (Abstract Only), (2005), 1 pg.
Hui, Y. H, "Handbook of Food Science, Technology and Engineering", vol. 4.2006, CRC Press, (2006), 167 pgs.
Maskan, M., et al., "Effect of different adsorbents on purification of used sunflower seed oil utilized for frying", Eur. Food Res. Technol., 217(3), (2003), 215-218.
"U.S. Appl. No. 12/452,984, Amendment under 37 C.F.R. Sec. 1.312 filed Jan. 25, 2013", 6 pgs.
"U.S. Appl. No. 12/452,984, PTO Response to 312 Amendment mailed Feb. 1, 2013", 2 pgs.
"International Application Serial No. PCT/GB2008/050659, International Preliminary Report on Patentability issued Feb. 9, 2010", 8 pgs.
"International Application Serial No. PCT/GB2008/050659, Written Opinion mailed Dec. 3, 2008", 7 pgs.

* cited by examiner

Key:
- ♦ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
- ♦ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
- ◆ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
- ◆ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
- ♦ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
- ♦ Sunflower oil + chips
- ■ Sunflower oil + clinker + chips
- ▲ Sunflower oil + OPC disk + chips
- ✕ Sunflower oil + OPC/clinker 50/50 disk + chips
- + Sunflower oil + OPC/clinker 25/75 disk + chips Key:
— ♦ — Sunflower oil + chips
— ■ — Sunflower oil + clinker + chips
— ▲ — Sunflower oil + OPC disk + chips
— ✕ — Sunflower oil + OPC/clinker 50/50 disk + chips
— + — Sunflower oil + OPC/clinker 25/75 disk + chips Key: ▨ OPC  ☐ OPC + clinker

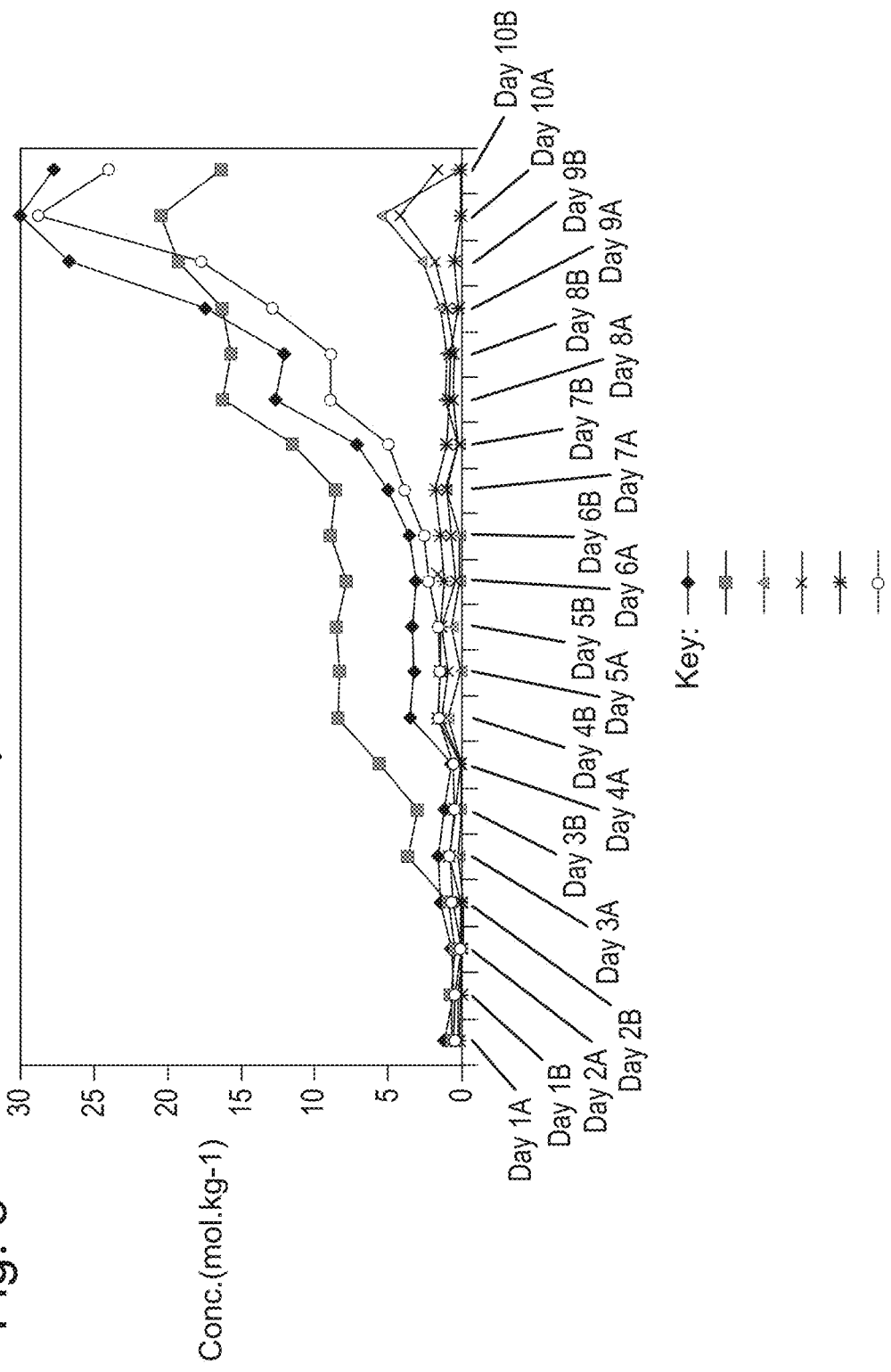

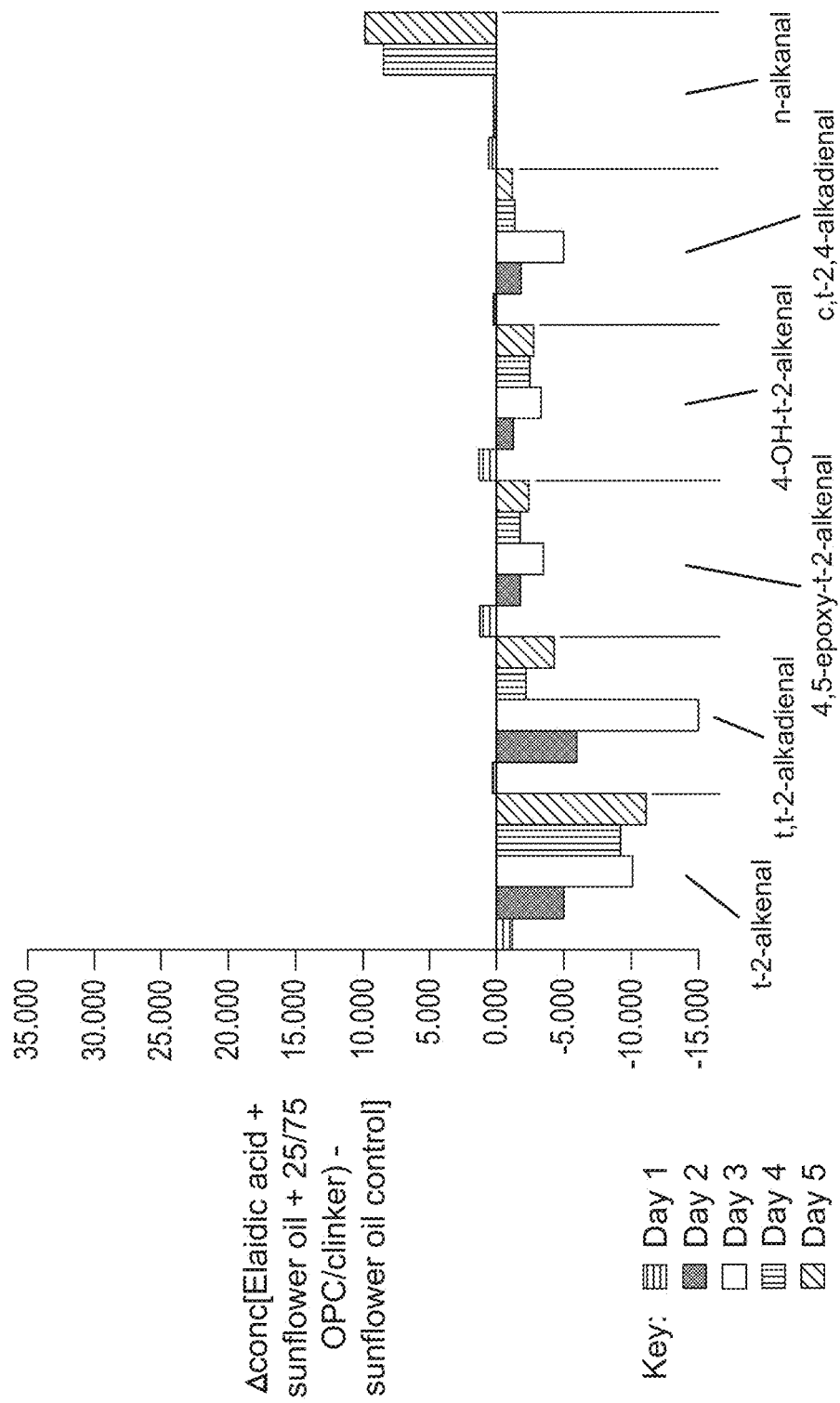

A490 colour test comparison
*trans,trans*-alka,-2,4-dienal

Key: —▲— Sunflower oil + chips
—■— Sunflower oil + OPC/clinker 25/75 + chips
—♦— Sunflower oil + OPC/clinker 25/75/TiO2 + chips Alderhyde Concentration Comparison Key: —▲— Sunflower oil + chips
—■— Sunflower oil + OPC/clinker 25/75 + chips
—♦— Sunflower oil + OPC/clinker 25/75/TiO2 + chips

HYDRAULICALLY SET CEMENT BODY FOR PRESERVATION OF ORGANIC LIQUIDS

REFERENCE TO PRIOR APPLICATIONS

This application is a continuation in part of U.S. application Ser. No. 12/452,984, filed Feb. 1, 2010, which is a 371 national stage of International Application No. PCT/GB2008/050659, filed Aug. 4, 2008, which claims the benefit of priority to UK Application No. 0715096.4, filed 3 Aug. 2007, the disclosures of which are hereby incorporated by reference in their entirety.

FIELD OF THE INVENTION

This invention relates in some embodiments to a hydraulically set oil-permeable cement body in the form of a stand-alone block or briquette for preserving cooking oil during deep fat frying. In further embodiments it relates to a method for in situ treatment of cooking oil or fat (which may be of vegetable or animal origin) e.g. during frying operations. It also relates to cooking oil containing a body as aforesaid for preservation of said oil.

BACKGROUND TO THE INVENTION

A number of specifications disclose the treatment of used cooking oil (includes vegetable oils and animal fats) from fat fryers in order to prolong the life of the oil.

Cooking oils are triglycerides whose structure is exemplified by the following compound having two radicals of oleic acid and one radical of palmitic acid attached to glycerol:

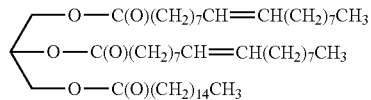

and additionally oils having as substituents multiply unsaturated fatty acid radicals e.g. linoleyl:

The following indicates the distribution of fatty acids in some common cooking oils, linolenic being

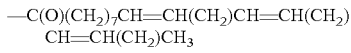

| Oil | Linolenic % | Linoleic % | Oleic % | Saturated % |
|---|---|---|---|---|
| Corn | 1.67 | 52.68 | 30.51 | 15.15 |
| Rapeseed | 6.76 | 23.56 | 58.39 | 11.29 |
| Sunflower | 0.95 | 60.29 | 26.57 | 12.19 |
| Olive, refined | 1.21 | 5.59 | 78.62 | 14.57 |
| Soyabean | 7.91 | 52.57 | 25.57 | 13.95 |
| GM Soyabean | 1.01 | 58.77 | 25.94 | 14.28 |

Deterioration of oil begins on exposure of oil to air or moisture. Simple storage of oil at ambient temperature can give rise to degradation, see e.g. Giullén et al., Detection of Primary and Secondary Oxidation Products by Fourier Transform Infrared Spectroscopy (FTIR) and 1H Nuclear Magnetic Resonance (NMR) in Sunflower Oil during Storage, *J. Agric. Food Chem.* 2007, 55, 10729-10736, 10729, the authors investigating the slow oxidation of edible oils and in particular sunflower oil on oxidation in the presence of air. Sunflower oil is a material of particular interest since it is used by most commercial food fryers.

Heating of oil during deep drying of food in oils whether the oil is in a hot stand-by mode or whether frying is being carried out gives rise to degradation products that contaminate the oil and have undesirable effects.

Hydrolysis by moisture or by the steam of cooking gives rise to free fatty acid which has surfactant properties and reduces the surface tension of the oil. As a result batter and breading absorb additional oil, giving rise to greasy fried food, and additionally the smoke point of the oil is reduced.

Oxidative degeneration of oils or fatty acids contained therein is free radical initiated and leads to various decomposition products including organic peroxides, alcohols, aldehydes, ketones, carboxylic acids, and high molecular weight materials. The oxidation process begins with the contact of air with hot oil or fatty acid therein and the ultimate creation of oxidized fatty acid (OFA). Continued heating transforms the OFA into secondary and tertiary by-products.

Contaminants in cooking oil are becoming of increasing concern from a health standpoint.

For example, Grootveld et al., *Food Chemistry*, 67 (1999) 211-213 warns that the formation of cytotoxic aldehydes in cooling oil during routine frying could be a health hazard.

Further undesirable contaminants in cooking oil are trans fats whose content in oil in a deep fryer may increase over time, especially if there is used an oil rich in ω-3 fatty acids e.g. canola or rapeseed oil. Scientific evidence shows that consumption of saturated fat, trans fat, and dietary cholesterol raises low-density lipoprotein (LDL), or "bad cholesterol," levels, which increases the risk of coronary heart disease (CHD). NYC banned cooking oils with trans fats from July 2007 and any trans-fat additives from July 2008. However, tests show that fatty acids including other toxic, mutagenous and carcinogens chemicals, such as aldehydes, are actually generated when deep fat frying. Even in GM modified soybean oils where the linolenic content has been reduced in favor of linoleic, trans fats will still form during the cooking process.

Various methods have been proposed for withdrawing cooking oil from a cooker where it is used, subjecting it to one or more purification treatments and returning the treated oil to the cooker. U.S. Pat. No. 3,947,602 (Vlewell et al., Bernard) discloses that the useful life of cooking oil is increased by treating the cooking oil with a food compatible acid and generally also with a suitable adsorbent such as an activated carbon. U.S. Pat. No. 4,112,129 (Duensing et al., Johns Manville) discloses filtering the oil through a composition comprising 47 to 59 parts by weight diatomite (70-80 wt % $SiO_2$), 28 to 36 parts by weight synthetic calcium silicate hydrate, and 12 to 24 parts by weight synthetic magnesium silicate hydrate. U.S. Pat. No. 4,330,564 (Bernhard) discloses a process for treating used fryer cooking oil comprising the steps of mixing said used cooking oil at a temperature of from about 150-200° C. with a composition comprising porous carrier e.g. rhyolite, water and food compatible acid e.g. citric acid and filtering the residue of said composition from said oil. US-A-2005/0223909 Kuratu) discloses filtering the oil through granite porphyry.

The effect of different absorbents on purification of used sunflower seed oil has been reviewed by Maskan et al., *Eur Food Res Technol* (2003) 217:215-218. The refining of used sunflower seed oil was investigated by various adsorbent treatments. Six adsorbents, CaO, MgO, $Mg_2CO_3$, magnesium silicate, activated charcoal and bentonite, as well as an available natural earth (i.e. pekmez earth, $CaCO_3$ containing special natural white soil) were studied. Pekmez earth, magnesium silicate (florisil) and bentonite exhibited the highest abilities in viscosity, free fatty acids (FFAs) reduction and colour recovery, respectively, among the adsorbents studied. Therefore, a mixture of 2% pekmez earth, 3% bentonite and 3% magnesium silicate was found to be the best combination. However the presence of adsorbents during the frying process was not disclosed.

Other methods have been proposed for treating cooking oil in situ in a cooker. U.S. Pat. No. 4,764,384 (Gyann, GyCor International) discloses that spent cooking oil may be rejuvenated by directly adding to the spent cooking oil in the fryer filtering media containing particles of material which become uniformly suspended throughout the liquid body of the spent cooking oil, the particles of filtering media material being effective to absorb contaminants and bleach the spent cooking oil to extend its useful life. The filtering media comprises synthetic amorphous silica provided with moisture, synthetic amorphous magnesium silicate, and diatomaceous earth. U.S. Pat. No. 4,681,768 (Mulflur et al.) discloses treating used cooking oils and/or cooking fats so as to permit use thereof over longer periods of time by contacting the oil or fat with an activated hydrated synthetic magnesium silicate which has a surface area of at least 300 $m^2/g$. The magnesium silicate functions to adsorb polar compounds of degradation such as FFA, OFA, colour bodies and secondary and tertiary by-products of degradation, which can be subsequently removed during the normal filtration of the used oil and/or fat. The magnesium silicate may function as a filter aid, or may be employed in conjunction with another filter aid during the filtration of the oil, as generally practiced in the art. U.S. Pat. No. 5,354,570 (Friedman, Oil Process Systems) discloses a method of frying food in cooking fluid within which degradation products comprising surfactants are produced therein and food residue accumulates, wherein there is added a treatment compound e.g. a porous rhyolitic material in the form of a powder capable of selectively reducing the amount of said surfactants in said used cooking fluid, and wherein the treatment compound is permitted to remain within said fryer apparatus and to settle upon said food residue while continuing said food frying process. U.S. Pat. No. 5,391,385 (Seybold, PQ Corporation) discloses the hot treatment of oil with a mixture of 60-80% amorphous silica and 20-40% alumina. The mixture can be placed in a permeable container which is then placed in the oil, the container being permeable to the oil but not to the mixture so that the adsorbent is not released into the oil and filtration is not required. When the mixture is spent, the container of the mixture can be removed from the oil. JP-A-07-148073 (Yoshihide) discloses finely pulverized zeolite stones inserted into bag of filter material to form a package which may be put into a cooking vessel together with oil and a cooking material, and cooked together.

SUMMARY OF THE INVENTION

The invention provides in some embodiments a hydraulically set oil-permeable article, comprising
 a cement body enclosed in a package that resists ingress of water or water vapor, wherein the cement body is a block or briquette for preserving cooking oil during deep fat frying,
 said cement body consisting of:
  greater than 50 wt % of a mixture of milled white ordinary Portland cement (OPC) clinker and white OPC in which the milled white OPC clinker is present in an amount of less than or equal to 15 wt % of the mixture,
  having no free water or having a low free water content for resisting damage on immersion in cooking oil and initial heating,
  optionally further consisting of silica 1-2 wt % and/or titanium dioxide 1-2 wt % and
  optionally further consisting of ingredients selected from calcium silicate, magnesium silicate, aluminium silicate, natural feldspars, natural sodium zeolites, natural calcium zeolites, synthetic sodium zeolites, synthetic calcium zeolites, wollastonite, calcium hydroxide, clays, pillared clays, activated clays/earths, talcs/kaolinite, amphiboles, granite porphyry, rhyolite, agalmatolite, porphyry, attapulgite and diatomaceous earth, and
  the body having the properties that it is porous so that oil can diffuse into it and contaminants can be deposited on and within it.

In a further embodiment the invention provides an hydraulically set oil-permeable cement body for preserving cooking oil during deep fat frying, said body being in the form of an apertured generally planar stand-alone block or briquette of mass 150-500 g, e.g. 150-250 g, and said body:
 (a) having substantially no free water or having a low free water content for resisting damage on immersion in cooking oil and initial heating;
 (b) being enclosed in packaging that resists ingress of water or water vapor and is of film or sheet selected from the group consisting of polyethylene, polypropylene, polyethylene terephthalate and metallized plastics; and
 (c) consisting of 100 wt % of a mixture of 65-85 wt % of milled white OPC clinker of average particle size of 10-50 μm, e.g. about 14.5 μm, and 15-35 wt % of white OPC, optionally with silica 1-2 wt % and/or titania (TiO2) 1-2 wt %; and
 the product having the properties that calcium and magnesium substantially do not leach into the oil and that it is porous so that oil can diffuse into it and contaminants can be deposited on and within it.

The invention provides in further embodiments a method for preserving cooking oil which comprises contacting the oil in situ with at least one oil-permeable cement body which has been hydraulically hardened from a paste comprising cement clinker and cement.

In embodiments of the invention, mixtures of cement clinker and cement can give rise to bodies having a surprisingly favorable combination of porosity and mechanical strength. It is also surprising that macroscopic bodies of the hardened paste are effective to remove impurities from oil and in particular that impurities may become trapped within the structure of the body which may be a stand-alone disc or briquette so that contaminant removal in some embodiments is not a mere surface phenomenon.

The invention also provides a method for preserving cooking oil which comprises treating the oil in situ within a fryer with a hydraulically set cement product, the product (a) being a stand-alone block or briquette, (b) having the properties that calcium or magnesium substantially do not leach into the oil and (c) that it is porous so that oil can diffuse into it and contaminants can be deposited on and within it.

The invention further provides cooking oil having a body therein as set out above and an oil-permeable cement body which has been hydraulically hardened from a paste comprising cement clinker and cement.

The invention further comprises a method of retarding the in situ formation of fatty acid in oil which comprises the in situ treatment of the oil with a solid filter treatment material derived from source of calcium or magnesium combined with a source of silicate such that the calcium or magnesium substantially does not leach into the oil.

The invention further comprises a method of retarding the in situ formation of oxidation products e.g. aldehydes in oil which comprises the in situ treatment of the oil with a solid filter treatment material derived from source of calcium or magnesium combined with a source of silicate such that the calcium or magnesium substantially does not leach into the oil.

The invention yet further provides a method of retarding the in situ formation of trans fat in oil which comprises the in situ treatment of the oil with a solid filter treatment material derived from source of calcium or magnesium combined with a source of silicate such that the calcium or magnesium substantially does not leach into the oil.

BRIEF DESCRIPTION OF THE DRAWINGS

How the invention may be put into effect will now be further described with reference to the accompanying drawings, in which:

FIG. 8 shows the concentration of the indicated materials in sunflower oil in following frying tests as a function of time over a two week period;

FIGS. 10-11 are bar charts showing aldehydic product contents in sunflower oil after cooking without and with a 25/75 ratio OPC/clinker treatment disk:

DESCRIPTION OF PREFERRED EMBODIMENTS

Oil Treatment

Figure 1:
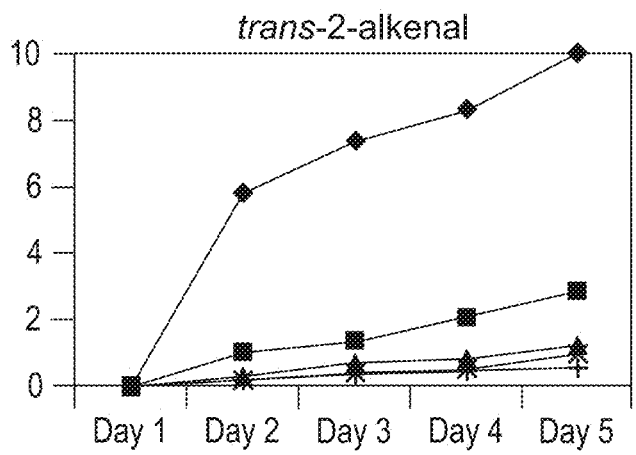
FIGS. 1-6 are graphs respectively showing concentrations of trans-2-alkenals, trans,trans-alka-2,4-dienals, 4,5-epoxy-trans-2-alkenals, 4-hydroxy-trans-2-alkenals, cis,trans-alka-2,4-dienals and n-alkanals generated from the heating of sunflower oil as a function of time, normalized relative to the concentration of trans-2-alkenals in control heated sunflower oil.
Figure 2:
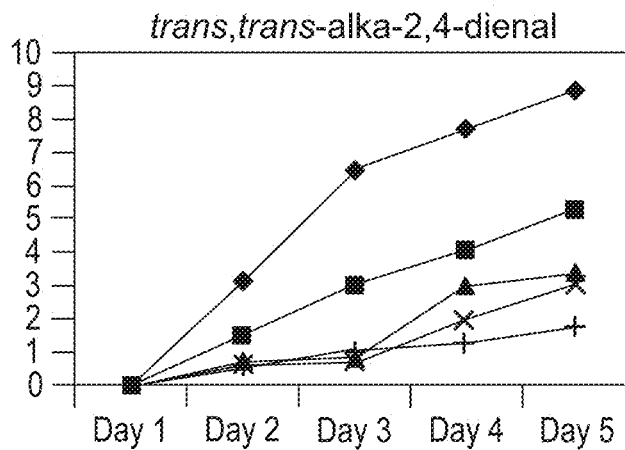
Figure 3:
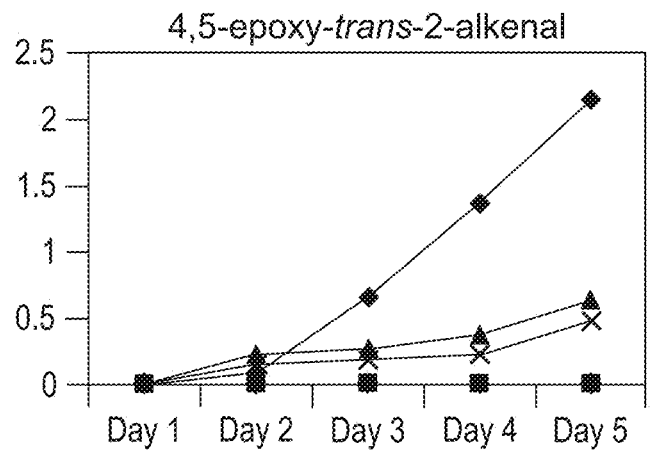
Figure 4:
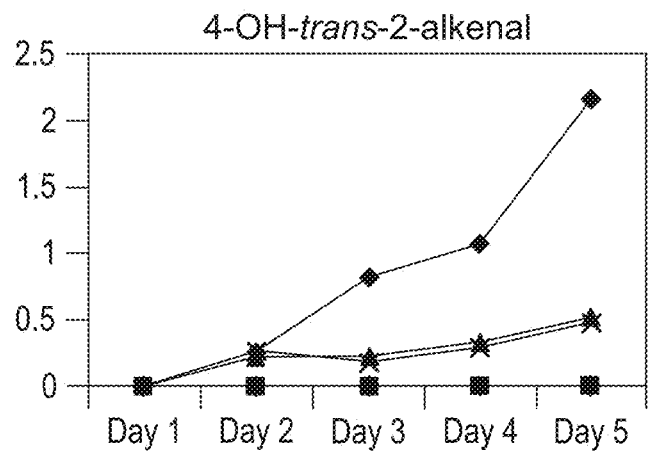
Figure 5:
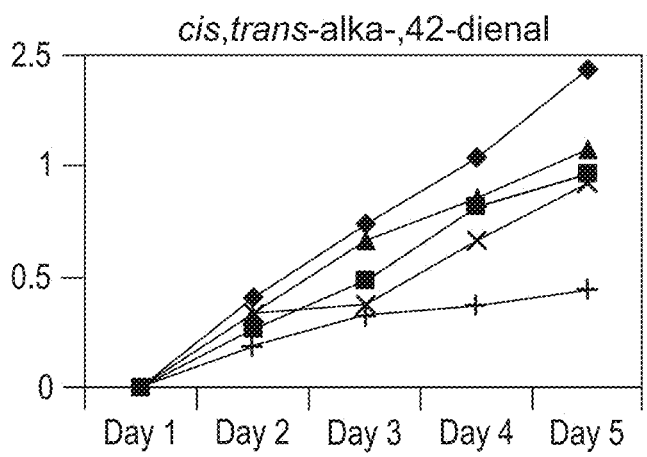
Figure 6:
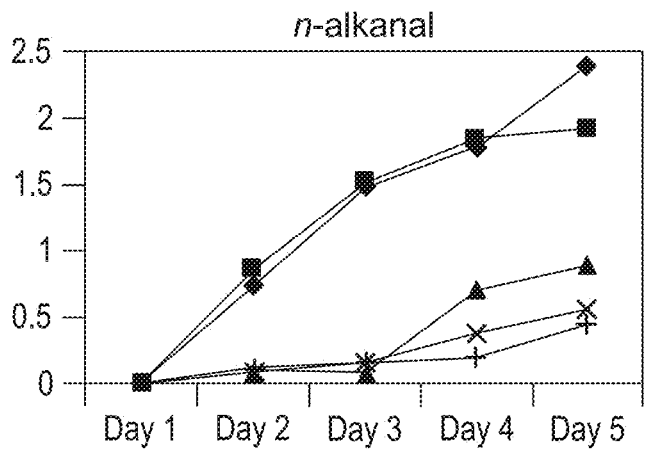

The invention is applicable to the treatment of oil generally, and to the preservation of oils in containers prior to use e.g. cans or plastics or glass containers, which may contain a body of solid material as described below e.g. a body of hydrated white OPC/white cement clinker. Said body is effective to slow the formation of FFA and oxidation products in the oil e.g. as a result of opening of the container and subsequent storage of the oil. An appropriate disc or block of hydraulically set white OPC/clinker may have approximately the dimensions and proportions relative to the container of a so-called "widget" used in cans of Guinness or other brands of beer to manage the characteristics of the beer e.g. it may be a disc of diameter about 3 cm.

The invention is also applicable to the in situ treatment of oil in domestic deep fat fryers e.g. of oil capacity 2-3.5 liters and which may incorporate a wire mesh or other mechanical filter for the oil. For domestic users the primary benefits may be in terms of long-term health rather than economy in the use of oil, and improved characteristics and taste of the cooked food. Existing appliances may be used without modification, a single disc or block which may be formed with through-holes to increase its surface area being suitable. The invention may also be used for in situ treatment of oil in counter-top single-basket or twin-basket deep fat fryers of oil capacity e.g. 7-16 liters, power rating 3-12 KW and usually with a single drain port, leaving filtration to the user. It may also be used with medium duty freestanding deep fat fryers e.g. of oil capacity 12-24 liters and rated at e.g. 9-18 kW, which may be provided with a cool zone having a lift-out strainer or drain spigot or oil drain point for draining the oil through a mechanical mesh or powder filter for removal of debris and for prolonging the life of the oil, and which are provided with an oil drain valve as a standard fitting. Standard commercial deep fat fryers may have e.g. two 15-liter baskets with lids, have about 25 kW power and may be provided with cool zones to promote thermal convection within the oil and for making the changing of oil simple and quick. The invention may also be used for treatment of oil in range-type fryers as found in the UK in fish-and-chip shops. Deep fat frying can be a vigorous process with local temperatures in the region of 160° C.-200° C. with water droplets and food debris in the oil In commercial applications with tanks with a capacity in excess of 15 L it is normal to have a central depression in the lower surface of the tank to define the cool spot. The filter may be placed in such location that thermal convection caused by the heater elements or gas flames, which heat the oil in certain positions and provides a lower temperature area or cool-spot, passes through the filter medium to remove burnt food residue, fatty acids created during the deep fat frying process, and other unwanted by-products or contaminants that otherwise affect the flavour, colour, appearance and specifically may be detrimental to the health of the consumer.

The function of embodiments of a cool zone in a deep fat fryer is explained e.g. in U.S. Pat. No. 5,355,776 (Driskill, Daylight Corporation). Heat provided by heaters is concentrated in the oil at an upper portion of the sidewalls with substantially no heat being transferred to the cooking oil through the lower portion of the sidewalls. In this manner the oil within the vessel is cooler in a lower V-shaped trough portion, thereby providing an upper frying zone and a lower cool zone in the cooking oil within the vessel. This arrangement of providing a V-shaped, or trough shaped, bottom for the vessel along with spaced apart heaters that do not heat the lowermost trough portion of the vessel bottom causes convection currents to be formed in the cooking oil in the fryer. These convection currents flow generally in circular paths within the cooking oil. The convection currents tend to move small particles of food that are dislodged or disassociated from the food being prepared into the lower cooking oil cool zone. The temperature of the oil in the cool zone is such that further cooking of the particles is substantially terminated so that the particles are less likely to become charred and blackened. Further, the movement of the food particles into the lower oil cool zone prevents a substantial portion of the particles from adhering to food being prepared. A similar arrangement may be provided for pressure fryers to which the invention is also applicable, see U.S. Pat. No. 6,505,546 (Koether et al., Technology Licensing Corporation). In fryers of this kind the present treatment composition may be situated either in the upper hot zone or in the lower cold zone.

Placement of the treatment block within the cool spot provides a location away from gas heating points usually located either side of the cool spot depression or interference with any electrical heating elements normally located on the floor of the oil tank either side of the cool spot thus preventing overheating of the filter block or housing and media, allowing free flow of oil around the heaters and allowing free flow of oil through thermal convection.

The number of blocks or briquettes to be used will depend on the volume of oil in the fryer. As an approximate guide, a block of weight 300-350 g and e.g. of generally planar shape with a depth 10-30% e.g. about 20% of its width if generally rectangular or diameter if circular will treat approximately 10 liters of oil.

Materials

In embodiments of the invention there may be used for decontamination of oil any material which is a reaction product of a source of calcium which is preferred or magnesium or a mixture thereof in an aqueous or organic medium with or without a catalyst (e.g. acid or base) with a source of silica to give a hydraulically set product which may be formed into shaped structures which are stable in hot oil and which do not leach harmful quantities of ionic species into the oil. Leaching of not more than 5 ppm calcium, preferably not more than 2 ppm is not detrimental, and up to 1 ppm of sodium but leaching of other ionic species e.g. iron, aluminum, zinc or copper should be kept to within negligible amounts. It is preferred that the source of calcium or magnesium and the source of silica should when mixed together act as a hydraulic material i.e. a material which sets and hardens after combining with water e.g. through formation of essentially water-insoluble hydrates.

One class of materials used in this invention is generally referred to as hydraulic cements. This means that the materials react with water to form a cementitious reaction product (calcium silicate hydrate gel) that acts as "glue" which binds the cement particles together. The most common cement is Portland cement but there are several varieties of hydraulic cement including high alumina cement, pozzolanic cement and plaster of Paris (gypsum). In this explanation we restrict the description to Portland cement but the invention covers the use of any hydraulic cement.

Portland cement and Portland cement clinker which may be used herein are made primarily from a calcareous material such as limestone or chalk and from alumina and silica, both of which are found in clay or shale. Marl, a mixture of both calcareous and argillaceous materials is also used. The raw materials are ground in a large rotary kiln at a temperature of around 1400° C. and the materials partially sinter together into roughly shaped balls (usually a few millimeters in size up to a few centimeters}. This product is known as clinker and is used almost exclusively as an intermediate in the production of cement. When it has cooled it is then ground to a fine powder and some gypsum is added to give a final product known as Portland cement. The process of manufacture involves grinding the raw materials and mixing them in certain proportions to yield a composition e.g. as shown in the table below (see A M Neville "*Properties of Concrete*", Pitman Publishing $2^{nd}$ Ed. 1977).

Approximate Composition Limits of Portland Cement

| Oxide | Content % |
|---|---|
| CaO | 60-67 |
| $SiO_2$ | 17-25 |
| $Al_2O_3$ | 3-8 |
| $Fe_2O_3$ | 0.5-6.0 |
| MgO | 0.1-4.0 |
| Alkalis | 0.2-1.3 |
| $SO_3$ | 1-3 |

The hydraulic reaction of cement powder with water is complex. The component oxides shown in the table above combine to from four main compounds. These are

| Tricalcium silicate | $3CaO \cdot SiO_2$ |
|---|---|
| Dicalcium silicate | $2CaO \cdot SiO_2$ |
| Tricalcium aluminate | $3CaO \cdot Al_2O_3$ |
| Tetracalcium aluminoferrite | $4CaO \cdot Al_2O_3 \cdot Fe_2O_3$ |

These compounds react with water to form calcium hydroxide and hydration products generally known as gel. One relatively fast reaction which causes setting and strength development is the reaction of tricalcium silicate which is the major and characteristic mineral in Portland cement with water to give the so-called C—S—H phase of cement according to the equation:

$$2Ca_3SiO_5 + 6H_2O \rightarrow 3CaO \cdot 2SiO_2 \cdot 3H_2O + 3Ca(OH)_2.$$

A further reaction which gives rise to "late" strength in cement is the reaction of dicalcium silicate with water also to form the C—S—H phase of cement:

$$2Ca_2SiO_4 + 4H_2O \rightarrow 3CaO \cdot 2SiO_2 \cdot 3H_2O + Ca(OH)_2.$$

Not all the cement powder reacts fully so that the hydration products are the "glue" that produce the cementitious reaction but there is usually a core of product that remains unhydrated. The setting process causes the essentially fluid state of cement slurry to change to a set and hardened product. The "curing" of cement is a term used to represent the time and the process needed for the hydration reaction time to proceed and can be enhanced by modestly elevated temperature and humidity e.g. around 40-50° C. and 100% relative humidity.

The cement clinker may be used in particle size from 1 μm to 10 mm i.e. in particles as supplied or as smaller particles or as solids made from finely comminuted and hydrated particles e.g. 5-100 μm more usually 10-50 μm. When using hydrated cement clinker and OPC, it has been found that a clinker milled to a similar particle size to that of the OPC e.g.

to a particle size of about 14.5 μm works well. OPC is supplied as powder by the manufacturer and if necessary may be further ground to reduce its particle size. It is preferred where possible to start with clinker which has a relatively narrow distribution of particle size because unevenness in particle size distribution is reflected in unevenness in the particle size distribution of the resulting milled product. The closer the particle size distributions are of the OPC and the OPC clinker the less well-packed the resulting particles will be and hence the higher the porosity of the resulting cast or molded article. It will be apparent that mention of particle size implies average particle size.

The setting reaction gives rise to porous structures which are permeable to cooking oil and promote reaction between impurities in the oil and the cement. In embodiments porosity extends throughout shaped articles made from cured cement which on immersion in water behave in the manner of a sponge. In some embodiments porosity arises naturally from the use of a mixture of cement clinker and cement. Water is added to powdered cement, clinker or a mixture thereof to give a paste that on setting forms a material having interconnected pores with a porosity above the percolation limit (e.g. porosity>10 vol. %). The porosity of the set material is primarily determined by the way in which the solid particles of the paste pack together, the gel that binds the particles together making relatively little difference to the porosity of the material. A model based on random close packing of spherical particles suggests a porosity of about 36%. Observed higher porosities may arise because the cement particles are not perfect spheres and because they tend to agglomerate together with large voids between the agglomerates. Furthermore the particles of the cement may themselves have porosity. The porosity of hardened cement paste is discussed e.g. by Alford et al. An assessment of porosity and pore sizes in hardened cement pastes, *J. Materials Sci.*, 16, (1981) 3105-3114, where porosities of e.g. 15-46% were reported and optical microscopy revealed that between 30 and 50% of the pore volume was found in pores in excess of 15 μm diameter. The pore diameters and the contact angles of oil and water are such that both water and oil can wick into and pass through the article. Porosity can be estimated by standing a cement article in water until the article is saturated with water, drying it in an oven e.g. at about 100° C.-220° C. (the latter being the highest temperature normally expected during frying) e.g. about 105-130° C. e.g. about 105° C. so that free water (i.e. water which has not become combined as water of crystallization in the cement) is driven off, comparing the water-saturated and dry weights and adjusting for the density of the cement. Estimated in this way, porosities of >10%, e.g. 20-80% in some embodiments about 20% to about 55% are desirable, increase in porosity significantly beyond about 55% in some embodiments giving rise to articles of reduced mechanical strength, the porosity being due to physical voids within the article.

Porosity may be promoted by milling the cement clinker to a finer particle size than that supplied by the manufacturer as previously mentioned and by using cement clinker and cement of similar or the same average particle size. In the cement industry, cement is made by grinding clinker with gypsum or anhydrite to a particle size range in which typically 15% by mass consists of particles below 5 μm diameter, and 5% of particles above 45 μm. The cement used in the experiments described below had an average particle size of about 14 μm. It is advantageous to mill the clinker to the same or a similar size. If the cement clinker and cement are divergent in size, there is a risk of bimodal packing leading to a denser and less porous structure.

If desired, the permeability the cement structures used in this invention may be increased e.g. by introducing air or other gas or a foaming agent into a mix of water with clinker or cement preferably so as to produce an aerated structure. Cut blocks of such structures have open-celled surfaces which facilitate uptake of liquids. Porous structures may also produced by adding water to a cement or clinker and cement mix a plastics or cellular plastics material which after the mixture has cured may be removed by heating or burning.

Particularly suitable filter treatment materials are white ordinary Portland cement (OPC), white cement clinker and combinations thereof. Clinker for forming such cements is kept as low as possible in transition metals e.g. chromium, manganese, iron, copper, vanadium, nickel and titanium and e.g. $Cr_2O_3$ is kept below 0.003%, $Mn_2O_3$ is kept below 0.03%, and $Fe_2O_3$ is kept below 0.35% in the clinker, the iron being reduced to Fe(II) to avoid discoloration of the cement. Limestone used in cement manufacture usually contains 0.3-1% $Fe_2O_3$, whereas levels below 0.1% are sought in limestones for white OPC manufacture. Apart from the white color which gives rise to products which are aesthetically pleasing and promote food industry and final customer confidence, the low transition metal content helps to minimize leaching of undesirable ionic species into the oil, especially iron and aluminium. Furthermore white OPC and white cement clinker contain relatively few iron and copper sites which can accelerate oxidation processes within the oil.

The present articles may be made from a mixture of OPC and OPC clinker, the clinker being the major component. White OPC and white OPC clinker are preferred. In embodiments the mixture is derived from OPC 15-35 wt % of (OPC+clinker) and clinker 65-85 wt % of (OPC+clinker), e.g. OPC 20-35 wt % of (OPC+clinker) and clinker 65-80 wt % of (OPC+clinker). A 25/75% mixture has been found to give the best combination of porosity and mechanical strength and to work well for the treatment of sunflower oil.

Figure 13:
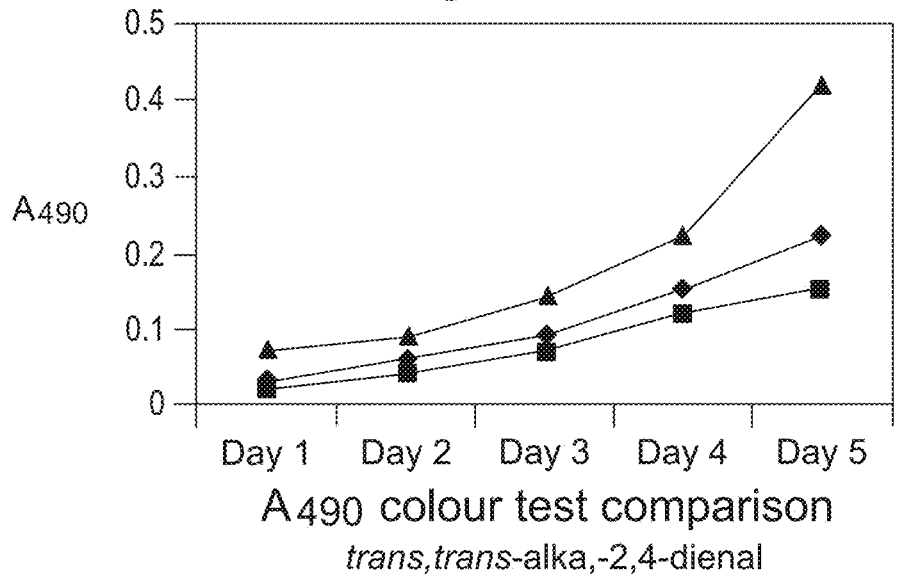
FIGS. 13 and 14 are graphs showing the effect on sunflower oil colour ($A_{490}$) and aldehyde comparison of frying in the presence of clips alone, a disc of 25/75 OPC/clinker and chips and OPC/clinker 25/75/$TiO_2$ plus chips.
Figure 14:
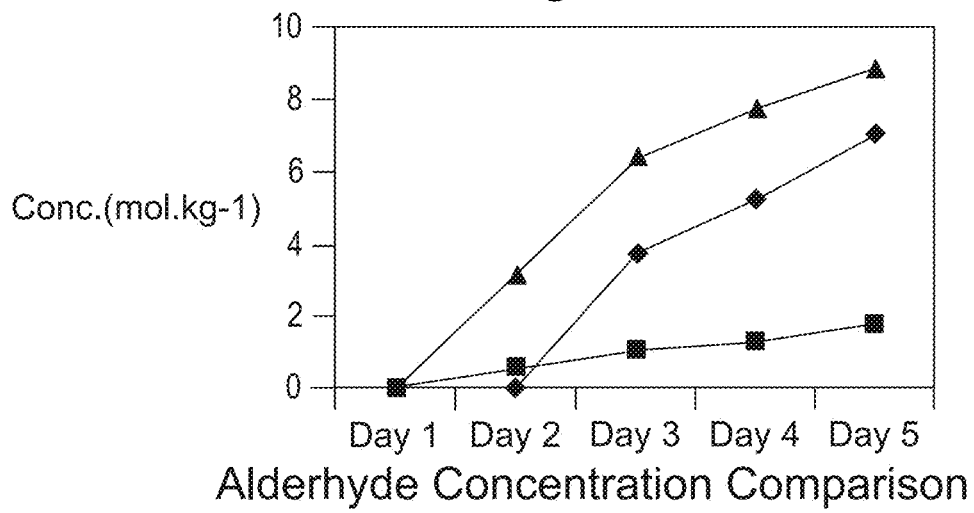

Stoichiometric hydration requires a ratio of water to cement of about 25 wt %, but it is standard practice for workability to add water in excess of that required for hydration e.g. in amounts of 30-50 wt %. Surplus water may be present within the porous microstructure of the cement and may be at least partly removed by drying the set cement product at an elevated temperature after the curing operation has been completed. It has also been found that articles of the cured cement are hygroscopic, and an apparently dry article can take up significant free water simply on standing in air for a day or two without observable change in its external appearance. It is desirable that the hardened hydraulic material used herein should be dried to remove all or a major part of the free water that is trapped in the pores of the material and thereby condition the material for entry of oil into its pores. If the pores contain water, immersion of the material into hot oil will drive off surplus water, and there will then be a "conditioning period" before the material becomes fully effective in oil removal. Adding the material to oil in a fryer at or close to ambient temperatures and bringing the oil to cooking temperature is preferred and minimizes stress on the material and release of water or steam into the oil. However, this may not be sufficient to prevent the material from becoming damaged especially in a commercial environment because chefs typically use fryers having powerful heaters (e.g. 4-5 KW) and for initial heating of the oil turn them fully on. The oil therefore becomes hot in a time which is less than the necessary conditioning time of the cement material, and there is a risk that rapid evolution of adsorbed water can damage or break up the article during the initial heating. Pre-conditioning of the material before it is used is therefore desirable and may be carried out by heating in a dry atmosphere e.g. at 50° C. or above e.g. in a fan-assisted dryer, in embodiments at 100° C. or just above e.g. 105°, and in further embodiments at or above the normally encountered cooking temperatures e.g. temperatures of 160° C. or above. In some embodiments, drying may be at 70-120° C. at 0.01-1 bar for 2-12 hrs e.g. at 120° C. for 4 hrs at 1 bar. For example, the cured article may be placed in racks in an oven at 120° C. (RH nominally ambient) for e.g. ~4 hrs, raising the temperature from room temperature at a rate of 10° C. every 5 minutes. The product is then cooled and packed Incidental ingredients may be added to OPC or OPC clinker, or to white OPC or white OPC clinker, including titania ($TiO_2$) typically in an amount of 1-2 wt % to promote whiteness and strength and/or silica typically in an amount of 1-2 wt % to promote strength. It is desirable, however, to select materials that are compatible in particle size to the cementitious materials e.g. clinker and OPC. For example, incorporation of $TiO_2$, as in FIGS. 13 and 14 lead to a significant reduction in effectiveness, probably because pigment grade $TiO_2$ has a particle size of 0.25 μm and is effective to at least partly block the internal structure of the material. Where OPC or OPC clinker are used these may comprise 100 wt % of the treatment material (apart from incidental ingredients as aforesaid) or they may comprise >50 wt %, typically >75 wt %, more typically >90 wt % of the treatment material. The further ingredients that may be used in combination with OPC, OPC clinker or a mixture thereof may be selected from calcium silicate, magnesium silicate, feldspars (natural) (albite), zeolites (natural & synthetic) (Na & Ca forms), silica (amorphous & crystalline)/sand, wollastonite, calcium hydroxide, alumina (hydrated), aluminium silicates, clays (bentonite, perlite), pillared clays, activated clays/earths, talcs/kaolinite, other silicate minerals (amphiboles, granite porphyry, rhyolite, agalmatolite, porphyry, attapulgite) etc. A further material that may be used according to the invention as treatment material with and without OPC and clinker is calcium silicate. However, the applicants have tested forms of calcium silicate as well as titanium oxide (see above) as additives, but these failed to provide any across the board advantage from a simple 2-material powder mix. The filter medium may be formed from a selection of primary materials and one or more binders/other additives as pellets or balls and may be formed as (i) slurry, extrude and sinter, (ii) powder pressed, (iii) cement, hydration process or (iv) foamed cement, break-up and ball mill. The above materials may be mixed with a calcium source e.g. lime or calcium sulphate to impart hydraulic properties.

The treatment or filter medium may be formed hydraulically from a selection of primary materials and one or more binders/other additives as pellets, balls, briquettes or stand-alone forms and may be formed by any of
(i) Powder pressing and hydration e.g. in a moist atmosphere
(iii) Cement hydration processing
(iii) Ram & Pressure casting.

Particular materials that may be incorporated into the filter medium include:
Activated carbon—decolourises the cooking oil and adsorbs odour-causing components.
A silicate—removes fatty acids that are formed as the oil begins to chemically break down.
Diatomaceous earth—functions to remove particulate matter and to provide increased holding capacity for particulate matter.

Stand-Alone Treatment or Filter Blocks

The use of cementitious materials including white cement clinker and white OPC lends itself to the formation of shaped articles which may be stand-alone forms such as blocks and briquettes or other complex shapes. Such articles are simple and inexpensive to manufacture by molding and are usually strong enough and sufficiently heat resistant to withstand immersion in hot cooking oil or fat without cracking, although addition to the oil while the oil is cool followed by heating will be the normal procedure. Stand-alone treatment blocks/briquettes may contain various shaped apertures formed by casting, extrusion, foam reticulation or other means to allow oil to pass inside the filter or treatment block and to increase the active surface area in contact with the cooking oil and to permit free flow of oil through the filter or treatment medium component (see e.g. FIGS. 12a-12d discussed below).

Figure 12A:
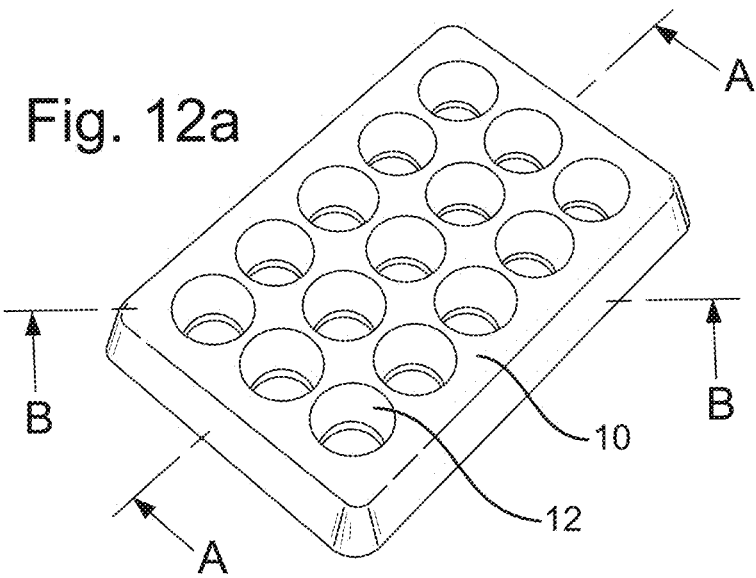
FIGS. 12a, 12b, 12c and 12d are respectively a top perspective view, a longitudinal sectional view along the line A-A of FIG. 12a, an end view and a perspective view partially cut-away along the line B-B of FIG. 12a of a prototype OPC/clinker block for use in in situ treatment of cooking oil during frying.
Figure 12B:
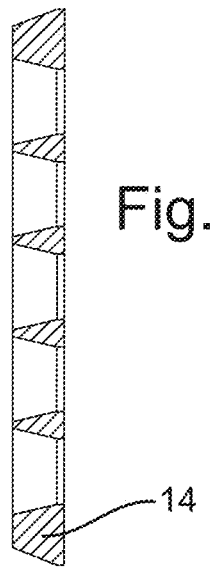
Figure 12C:
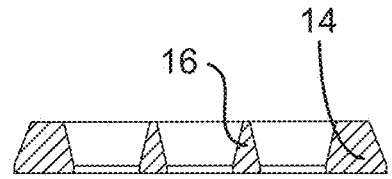
Figure 12D:
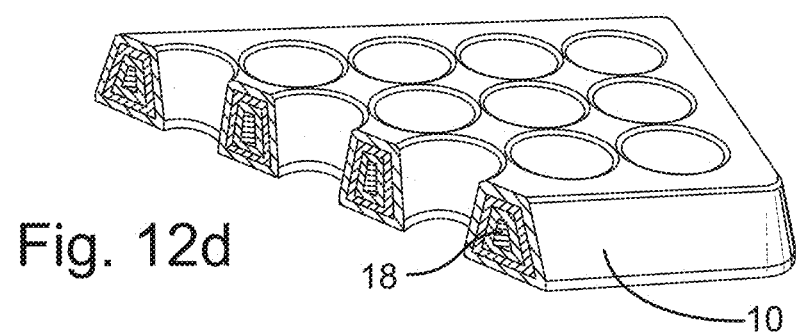

Such articles in embodiments may be of mass e.g. 50 g-3 kg e.g. 150 g-1 kg, e.g. 150-500 g, e.g. 250-350 g. They may be generally planar with at least one through hole, e.g. 10-40 through holes e.g. 15 through holes and may be generally rectangular with a length greater than the width and with a depth less than three times the width e.g. in some embodiments 10-33% of the width, e.g. in some embodiments 15-25% e.g. in some embodiments. about 20% of the width. If the article is circular or oval then the depth may be 10-33% of the diameter or width. Alternatively the dimensional proportions of the articles can be considered in terms of the ratio of volume to surface area which may be 30-45 cm %. For example an article e.g. in the form of a planar structure as illustrated in FIG. 12a in embodiment has a volume of about 150 $cm^3$ and a surface area of about 450 $cm^2$ giving a ratio of about 33 cm %. The ratio may be alternatively expressed as a volume to surface area of from 0.3:1 to 0.45:1.

The present materials work by both bulk and surface reaction with impurities in the oil, reaction within the bulk of the material being significant. Presently preferred embodiments are either simple disks or blocks or for treatment of larger volumes of oil blocks with depressions or through-holes to increase the surface area in contact with the oil and to promote oil flow through the block. Blocks of complex shape can incorporate both relatively thick and relatively thin regions or lands, and it is preferred that the block or some of the lands should have a path length to their center of 5-50 mm, in some embodiments 10-30 mm e.g. about 15 mm. In particular the apertures may be disposed in an array with relatively thick interior regions bounded by four apertures and with a relatively wide region surrounding the array of apertures. In designs of this type, the inventors have found that breakdown products tend to deposit preferentially in the middle of the wider regions, and surprisingly that the deposits appear to form preferentially deep in the interior of those regions.

Early tests were carried out in 600 ml of cooking oil using a single disc-shaped treatment block of ~20 cc giving an approx 30:1 oil to filter ratio by volume. Employing one 50 mm dia×10 mm thick disc of slip cast hydrated OPC and clinker in a 25%/75% ratio in 600 ml of sunflower oil cooking chips for a period of 5 days compared to a control sample with no filter, NMR results indicate a >80% reduction in key fatty acids and aldehydes. Upon acquisition of a deep fat fryer with a 5 liter tank, to maintain approximately the same ratio of filter to oil volume eight of the above disks were employed. When testing specifically filter volume attributes it was decided to produce cylindrical test filters equivalent to two and four discs—e.g. 50 nm diameter×20 mm length and 50 mm diameter×40 mm length. In practice only the 10 mm and 40 mm disks were fully employed. The 40 mm long cylindrical filters provided a volume of approx 80 cc. When using these in 5 liter oil tests, two cylinders were employed. Tests showed that performance is improved on increasing the area of hardened cement in contact with the oil. Tests have also been carried out using the "waffle-type" treatment blocks of FIG. 12.

In some embodiments after pre-conditioning and cooling to ambient temperatures the dry material may be provided in sealed packaging or wrapper for preventing water ingress, which preferably is not opened or removed until immediately before use. It be sealed e.g. vacuum packed into a pouch or other container of low water permeability film or sheet or the like e.g. polyethylene, polypropylene or polyethylene terephthalate or metallized plastics. In some embodiments individual products are packed into polypropylene bags or pouches e.g. of oriented polypropylene. In particular embodiments the film of the bag or pouch may comprise first and second layers e.g. of oriented polypropylene laminated together, one of them providing an outer layer and the other providing an inner heat-sealable layer, and with the printing ink provided by reverse printing on the first layer e.g. by multi-color flexographic printing. Sandwiching the ink between layers of a laminate reduces the effects of scratching or scuffing by the product packaged within the bag or pouch during handling and transport and assists in maintaining a pristine glossy appearance until the product is to be used. Layer thickness may be e.g. about 20 μm, the thickness of the laminate being e.g. about 40 μm. If desired after it has been packed the dry material may be irradiated or otherwise sterilized to reduce the risk of microbial growth during storage. As previously explained in use the sealing material into which the article is packed will be removed before the article is contacted with the cooking oil. The wrapper may be removed and the article may be placed into the oil, which should be cool e.g. at or about ambient temperature, using dry hands or using gloves in order to avoid unnecessary contact of the article with moisture, or alternatively the article may be placed in position first and then oil at or about ambient temperature may be added. For example, the article may be removed from its packaging and placed on the bottom of a tank of a fryer, after which the fryer is filled with oil and the heater is turned on. As the oil warms, any residual adsorbed moisture is expelled from the article and air is expelled so that the article appears to bubble. By the time that the oil has reached cooking temperature or shortly thereafter, evolution of bubbles from the article will have ceased and frying can be initiated. The wrapper prevents inadvertent contact with water, e.g. from being placed accidentally under a running tap before the article is contacted with the oil, or in other from other incidents where there is a risk of a large ingress of water into the block before it is contacted with the oil.

How the invention may be put into effect will now be further described with reference to the following examples.

Example 1

Cement Clinker and OPC

Aalborg White Cement Clinker and Aalborg White OPC are materials available from Aalborg Portland Group of Denmark Aalborg white OPC is produced from extremely pure limestone and finely-ground sand. It has a low alkali ($Na_2O$) content of 0.2-0.3 wt %, a low tricalcium aluminate (C3A) content of 4-5 wt % and a chromate content of not more than 2 mg/kg.

The white cement clinker as supplied had a particle diameter of 8 mm, an analysis of $SiO_2$ 25.0%, $Al_2O_3$ 2.0%, $Fe_2O_3$ 0.3% and CaO 69.0%, and a Bogue composition of C3S 65.0%, C2S 21.0%, C3A 5.0% and C4AF 1.0% wherein C3S represents tricalcium silicate $Ca_3SiO_5$s, C2S represents dicalcium silicate $Ca_2SiO_4$, C3A represents tricalcium aluminate $Ca_6Al_2O_6$ and C4AF represents tetracalcium alumino-ferrite $Ca_4Al_2Fe_2O_{10}$. The white cement clinker had a surface area of 0.43 $m^2/g$, porosity of 37% and density of 1.1. It was effective to remove free fatty acids, aldehydes and other contaminants from oil, and gave rise to the following benefits:

Increase of the useful lifetime of cooking oil by 40 to 70% to or even up to 100% or more.

Reduced build up of fatty acids, oxidation products (carcinogens such as aldehydes, peroxides and free radicals etc)—health.

Improved taste and appearance of fried food.

Reduced acid value and viscosity (caused by oxidation products).

Reduced quantity of used cooking oil requiring disposal.

The OPC had an analysis of $SiO_3$ 2.03%, $SiO_2$ 24.4%, $Al_2O_3$ 1.97%, $Fe_2O_3$ 0.34%, CaO 68.6%, MgO 0.58%, Cl 0.01%, $TiO_2$ 0.09%, $P_2O_5$ 0.30%, $K_2O$ 0.16% and $Na_2O$ 0.19%, a Bogue composition of C3S 66.04%, C2S 20.1%, C3A 4.64%, C4AF 1.04% and $CaSO_4$ 3.45%

Both materials were milled as appropriate to give a desired particle size e.g. 14.5 μm.

Preparation of Disks

Hydrated OPC and clinker samples were prepared as follows. Discs were cast in containers of 50 mm diameter to give 50 mm diameter discs ~10 mm in thickness. In order to form the discs, there were used 30 g OPC and 12 g water for cement only, and e.g. 15 g OPC plus 15 g clinker with 12 g water for the 50/50 OPC & clinker formulation. Water was added to the cement/clinker and the mixture was stirred with a spatula to give a creamy porridge-like consistency, after which the mixture was poured into a paper cup and the cup was put into a plastics container over water so that the relative humidity in the container was ~100%. The container was maintained at 40-50° C. for 5 days.

Porosity was estimated as follows. Samples of filter disk materials were soaked in water overnight, patted dry, weighed and then placed in a furnace (ca. 220° C.) for a further overnight period and then further weighed. The % absorption of water was deduced by using the formula %=((((weight boat+wet disk)−weight boat)−((weight boat+dry disk)−weight boat))/((weight boat+dry disk)−weight boat)))×100. Typically five disk samples of each type were analyzed. Porosities estimated by Fairy Industrial Ceramics Limited (FICL) by an alternative method are also indicated. Strength was tested using an Instron 1122 universal testing machine and a standard 3-point test jig with adjustable span settings, again supplied by Instron. Typically a span of 40-50 mm was used depending on the sample. Load was applied to the sample using a crosshead speed of 5 mm/min. A peak load was measured using a tension-compression load cell (model A217-12) capable of reading 100, 200, 500, 1000, 2000 & 5000N full-scale ranges. The modulus of rupture of the sample was then calculated using $f_{max}=6\ WL/4\ bd^2$ where b=the width and d=thickness of the sample. W=applied load and L is the span.

The hydrated samples had the following properties, the OPC particle size being 14.5 μm:

TABLE 1-1

| Sample No. | OPC % | Clinker % | Wt % water adsorption (SBU) | Porosity (%) | Flexural Strength (MPa) Instron |
|---|---|---|---|---|---|
| 1 | 100 | | 19.22 | ~38.44 | 4.03 |
| 2 | | 100 | 26.12 | ~52.14 | * |
| 3 | 50 | 50 (14.5 μm) | 23.31 | ~46.62 | 3.76 |
| 4 | 25 | 75 (14.5 μm) | 25.31 | ~50.62 | 14.7 |
| 5 | 75 | 25 (14.5 μm) | 22.57 | ~45.14 | 3.0 |
| 6 | 50 | 50 | * | * | * |
| 7 | 50 | 50 (50 μm) | 20.82 | ~41.64 | 3.3 |
| 8 | 50 | 50 (100 μm) | 19.28 | ~38.56 | 5.8 |

It will be observed that Sample 4 made from 25/75 OPC/Clinker with the clinker milled to substantially the same particle size as the cement gives the best combination of mechanical strength and porosity.

Evaluation of the Discs

The above filter disks, e.g. of formulation e.g. 25% hydrated OPC/75% white clinker (typical weight 35 g), were placed in 400 ml of sunflower oil, the oil then being allowed to attain an optimum cooking temperature of 180° C. through the use of an electronic hotplate. 90 g of potato chips was then added to the hot oil and cooked until "brown". They were then removed and replaced with fresh chips of the same weight, this being repeated so as to give a total number of fries per day of 8. A total of 5 days frying was performed. After each day's frying, a sample of oil was retained and viscosity, pH, color and $^1$H NMR spectroscopic measurements were performed. Results of the experiments can be summarized as follows:

Leaching Performance

This was evaluated as follows. 10.0 ml of a sunflower oil sample after five days frying with potato chips was ashed in a furnace operating at 500° C. for 5 hours, microwave digested in 10.0 ml of concentrated nitric acid, subsequently diluted to a final volume of 25.0 ml with deionised water and then analysed (% Ca, Fe, Na, Al, Zn, Cu) by ICP-AES (Thermo Jarrell Ash Trace Scan). The elemental analysis results are in Table 1-2.

TABLE 1-2

| Material | Ca | Fe | Na | Al | Zn | Cu |
|---|---|---|---|---|---|---|
| Clinker | 0.575 | n.d. | 0.010 | n.d. | n.d. | 0.021 |
| OPC disk | 0.832 | n.d. | 0.539 | n.d. | n.d. | 0.002 |
| OPC/clinker disk 50:50 | 1.022 | n.d. | 0.557 | n.d. | 0.125 | 0.013 |
| OPC/clinker disk 25/75 | 0.306 | n.d. | 0.306 | n.d. | n.d. | n.d. |
| OPC/clinker disk 75/25 | 3.023 | n.d. | 0.243 | n.d. | 0.006 | 0.045 |

[a] n.d.—none detectable. All values in ppm.

Calcium and sodium are physiologically acceptable cations, and leaching into oil at the level of <5 ppm preferably <2 ppm is desirably <1 ppm. Leaching of other cations e.g. Fe, Al, Zn and Cu should be minimized. None of the above samples exhibited detectable leaching of either Fe or Al. It will be noted that the OPC 25 wt %/clinker 75 wt % disc exhibited low leaching of calcium and other materials.

pH, Viscosity & Colour

Measurement of pH provides an indication of the level of acidic species present in the oil. Measurement of viscosity and colour provide an indication of the level of oxidative degradation products present in the oil.

pH was measured using an Electric Instruments Ltd pH Meter model 7010. pH values measured for aqueous/supernatant samples (extracted from an oil/water 1:1 mixture) of sunflower oil used to fry potato chips and treated with the various added materials.

Viscosity was measured using a Brookfield model DV-1 digital viscometer, no. 4 rotor. Viscosity values (mPa·s) were measured for samples of sunflower oil used to fry potato chips and treated with the various added materials.

Color was measured using a Unicam UV %-2 UV-VIS electronic spectrophotometer operating in the 250-700 nm range. The absorbance value of an oil sample was measured at the internationally-recognised wavelength of 490 nm, acceptable theoretical range 0.0-1.0 absorbance units.

Particle sizes of the materials used to form the disks in the various tests reported in Table 1-3 are as indicated.

TABLE 1-3

| Sunflower oil | Day | pH | Viscosity (MPa) | Colour ($A_{490}$) |
|---|---|---|---|---|
| Sunflower oil control | 0 min | 6.7 | 62 | N/A |
| | 30 min | 5.9 | 78 | |
| | 60 min | 5.6 | 88 | |
| | 90 min | 5.4 | 94 | |
| Chips Control | 1 | 6.0 | 76 | 0.04 |
| | 2 | 5.5 | 74 | 0.05 |
| | 3 | 4.8 | 72 | 0.16 |
| | 4 | 4.7 | 90 | 0.27 |
| | 5 | 4.7 | 114 | 0.63 |
| Chips Clinker (Sample 2) | 1 | 6.0 | 68 | 0.07 |
| | 2 | 5.8 | 64 | 0.09 |
| | 3 | 5.8 | 64 | 0.14 |
| | 4 | 5.2 | 70 | 0.22 |
| | 5 | 5.2 | 94 | 0.42 |
| Chips OPC | 1 | 6.2 | 64 | 0.02 |
| | 2 | 6.0 | 68 | 0.05 |
| | 3 | 5.9 | 72 | 0.07 |
| | 4 | 5.9 | 74 | 0.09 |
| | 5 | 5.8 | 88 | 0.19 |
| Chips hydrated OPC disk (Sample 1) | 1 | 6.0 | 64 | 0.05 |
| | 2 | 5.9 | 70 | 0.10 |
| | 3 | 5.7 | 72 | 0.14 |
| | 4 | 5.6 | 74 | 0.18 |
| | 5 | 5.6 | 98 | 0.30 |
| Chips hydrated OPC/clinker 50/50 Clinker 14.5 μm (Sample 3) | 1 | 6.0 | 64 | 0.05 |
| | 2 | 5.9 | 70 | 0.10 |
| | 3 | 5.7 | 72 | 0.14 |
| | 4 | 5.6 | 74 | 0.18 |
| | 5 | 5.6 | 98 | 0.3 |
| Chips hydrated OPC/clinker 25/75 (Sample 4) | 1 | 7.2 | 78 | 0.02 |
| | 2 | 7.2 | 78 | 0.04 |
| | 3 | 7.2 | 86 | 0.07 |
| | 4 | 6.8 | 88 | 0.12 |
| | 5 | 6.8 | 94 | 0.15 |
| Chips hydrated OPC/clinker 75/25 (Sample 5) | 1 | 7.0 | 78 | 0.02 |
| | 2 | 7.0 | 78 | 0.03 |
| | 3 | 7.0 | 82 | 0.06 |
| | 4 | 6.7 | 88 | 0.13 |
| | 5 | 6.7 | 94 | 0.36 |
| Chips hydrated OPC/clinker 50/50 Clinker 50 μm (Sample 7) | 1 | 7.0 | 78 | 0.02 |
| | 2 | 6.9 | 78 | 0.04 |
| | 3 | 6.9 | 86 | 0.07 |
| | 4 | 6.9 | 86 | 0.1 |
| | 5 | 6.8 | 94 | 0.21 |
| Chips hydrated OPC/clinker 50/50 | 1 | 7.0 | 78 | 0.03 |
| | 2 | 6.9 | 78 | 0.04 |
| | 3 | 6.9 | 82 | 0.08 |

TABLE 1-3-continued

| Sunflower oil | Day | pH | Viscosity (MPa) | Colour ($A_{490}$) |
|---|---|---|---|---|
| Clinker 100 μm (Sample 8) | 4 | 6.9 | 84 | 0.24 |
| | 5 | 6.9 | 94 | 0.58 |

It will be apparent that pH stability is better using the white Portland cement clinker indicating most effective reduction of acid, whereas change in viscosity and color is less with OPC, indicating reduction in oxidation products, so that the use of these materials in combination gives the good results. As regards particle size, 14.5 μm for both clinker and OPC was found to give the best results.

$^1$H NMR Spectroscopic Measurements:

Aldehyde by-products cause many of the off-flavors and off-odors in oil and fried food. They are secondary lipid oxidation products resulting from the degradation of primary oxidation products of cooking oil, e.g. hydroperoxydienes and include the following oxidation products which have been studied herein as indicators, although many other oxidation products are usually present:
(a) trans-2-alkenals (usually associated with oxidation of relatively higher monounsaturated oils),
(b) trans,trans-alka-2,4-dienals,
(c) 4,5-epoxy-trans-2-alkenals (main oxidation product arising from oxidation of trans,trans-alka-2,4-dienals, see Guillen et al., *Lipid Sci. Food Agric.*, 85 (2005): 2413-2420),
(d) 4-hydroxy-trans-2-alkenals (likely oxidation product arising from oxidation of 4-hydroperoxy-trans-2-alkenals, see Guillen et al., supra,
(e) cis,trans-alka-2,4-dienals (geometrical isomer of trans,trans-alka-2,4-dienals, usually appears at a level of 25% of that detected for trans,trans-alka-2,4-dienals) and
(f) n-alkanals (usually associated with oxidation of relatively higher monounsaturated oil.

From the standpoint of toxicity in the above list the relative toxicity is believed to be in the order (c) & (d)>(a), (b) & (e)>(f).

Aldehydic concentrations based on electronic integration of detectable NMR signals of known chemical shift (frequency scale) value. Bruker Avance 600 MHz NMR spectrometer operating at a frequency of 600.13 MHz and a probe temperature of 298 K. 0.30 ml aliquots of each oil were diluted to a volume of 0.90 ml with deuterated chloroform ($C^2HCl_3$) which provided a field frequency lock, and the samples placed in 5-mm diameter NMR tubes. The $C^2HCl_3$ solvent contained $5 \times 10^{-3}$ mol·dm$^{-3}$ 1,3,5-trichlorobenzene (identified as a singlet resonance at δ=7.227 ppm) which served as a quantitative internal standard. Typical pulsing conditions for the 600 MHz spectrometer included 64 free induction decays (FIDs) using 32,768 data points, acquisition time 3.4079 s, sweep width 9615.38 Hz. Chemical shifts were referenced to residual chloroform (δ=7.262 ppm). Aldehydes measured in NMR spectra: (a) trans-2-alkenal, (b) trans, trans-alaka-2,4-dienal, (c) 4,5-epoxy-teans-2-alkenal, (d) 4-OH-trans2-alkenal, (e) cis, trans-alka-2,4-dienaland (f) n-alkanal. Resonances present in each spectrum were routinely assigned by a consideration of chemical shift values, coupling patterns and coupling constants. Results were as shown in Table 1-3 below. It was observed that clinker gives best adsorption of aldehydes and OPC gives the best pH, viscosity and colour results, so that a combination of the two is desirable.

TABLE 1-4

Sample results (concentration units are millimoles)

| 5 Days | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Sunflower oil Control | 23.9 | 36.9 | 4.5 | 3.5 | 6.9 | 5.0 |
| Chips Control | 27.1 | 23.9 | 5.8 | 5.8 | 3.9 | 5.2 |
| Chips Clinker (Sample 2) | 7.7 | 14.2 | 1.3 | 0.0 | 2.6 | 6.5 |
| Chips OPC | 17.6 | 32.0 | 3.8 | 3.8 | 6.8 | 9.9 |
| Chips hydrated OPC disk (Sample 1) | 3.4 | 9.0 | 1.7 | 1.4 | 2.9 | 2.4 |
| Chips hydrated OPC/clinker 50/50 Clinker 14.5 μm (Sample 3) | 2.7 | 8.2 | 1.3 | 1.9 | 3.1 | 1.5 |
| Chips hydrated OPC/clinker 25/75 (Sample 4) | 1.6 | 4.7 | 0.0 | 0.0 | 1.2 | 1.2 |
| Chips hydrated OPC/clinker 75/25 (Sample 5) | 2.1 | 4.8 | 0.0 | 0.0 | 1.5 | 1.3 |
| Chips hydrated OPC/clinker 50/50 Clinker 50 μm (Sample 7) | 2.1 | 4.6 | 0.0 | 0.0 | 1.8 | 1.2 |
| Chips hydrated OPC/clinker 50/50 Clinker 1000 μm (Sample 8) | 2.3 | 5.9 | 0.0 | 0.0 | 1.3 | 1.6 |

Graphical Results

Figure 7:
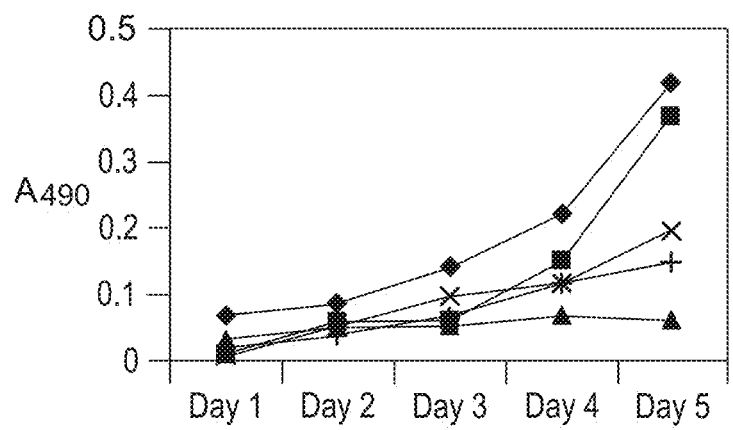
FIG. 7 is a graph of absorbance unit values (A490) as a function of time for samples of heated sunflower oil with chips and with clinker. OPC or combinations thereof.

Aldehydic concentration data obtained from the NMR experiments are shown in FIGS. 1-6, whilst the results from the color measurements are shown in FIG. 7. Frying performance using OPC clinker 25/75 over a two week period (5 frying days per week) is shown in FIG. 8. It will be noted that content of cis,trans-alka-2,4-dienal, 4-hydroxy-trans-2-alkenal and 4.5-epoxu-trans-2-alkenal remained low throughout the period of the test and that concentrations of n-alkenal, trans-2-alkenal and trans-trans-alka-2,4-dienal also remained relatively low through most of the test period.

Example 2

Experiments on Beef Dripping

An "aldehyde cocktail" was created by adding three of the main aldehydes (trans-2-alkenals, trans, trans-alka-2,4-dienals, and n-alkanals) to beef dripping (500 g) so as to have a typical aldehydic concentration of 10 mmol/kg dripping (ca. 2 mmol/kg dripping in the case of cis,trans-alka-2,4-dienals, reflecting its typical distribution in a trans, trans-alka-2,4-dienal sample).

A filter disk (either OPC—filter 1 or OPC/clinker 50/50—filter 2, typical disk weight 35 g) was placed in the dripping, the oil then being allowed to attain an optimum cooking temperature of 180° C. through the use of an electronic hotplate. Where appropriate (see below), 90 g of potato chips was then added to the hot fat and cooked until "brown". They were then removed and replaced with fresh chips of the same weight, this being repeated so as to give a total number of fries per day of 8. A total of 2 days frying was performed. After each days frying regime, a sample of dripping was retained and $^1$H NMR spectroscopic measurements were performed. For the two disk material types a total of five experiments were performed, reflecting all potential combinations of potential aldehydic retention:
(a) dripping/filter 1/no chips,
(b) dripping/filter 2/no chips
(c) dripping/chips, (d) dripping/filter 1/chips,
(e) dripping/filter 2/chips.

Figure 9:
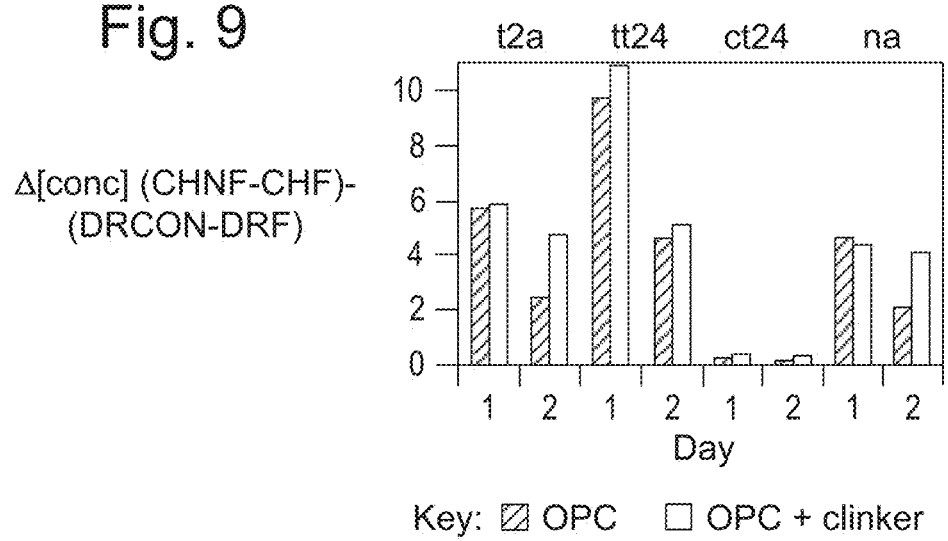
FIG. 9 is a bar-graph showing differential concentrations for the four main aldehydic species in the two day beef dripping experiments. Abbreviations: t2, tt24, ct24 and na refer to trans-2-alkenals, trans,trans-alka-2,4-dienals, cis,trans-alka-2,4-dienals and n-alkanals, respectively. Δ[conc] (CHNF—CHF)-(DRCON-DRF) refers to the various experiments (averages of fully normalized values, describing three different sets of the five main experiments), i.e. CHNF (dripping/chips/no filter), CHF dripping/chips/filter, DRCON (dripping/no chips/no filter), DRF (dripping//filter), for each day of the two day experiment, as indicated in the x-axis of the graph.

This experimental regime was repeated twice. A further control experiment involving dripping plus aldehydic cocktail with no chips or filter material was also performed. The results are shown in FIG. 9.

Example 3

Experiments Using Sunflower Oil/Eliadic Acid

Direct heating of a small sample of the trans fatty acid elaidic acid led to the acquisition of an NMR spectrum that showed significant levels of trans-2-alkenals and n-alkanals, not unexpected for a monounsaturated fat (with the proviso that trans converts to cis upon heating).

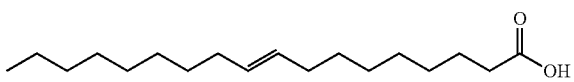 [SMILES: CCCCCCCC/C=C/CCCCCCCC(=O)O]

Tests were conducted on sunflower oil that had a sample of elaidic acid added, with subsequent frying of potato chips. The experimental procedure was the same as that employed in the previous examples with the exception that 0.5 g of elaidic acid was added to 400 ml of sunflower oil (giving a concentration of ca. 4 mmol/kg oil). One set of tests featured just this mixture whilst the other also included the addition of a 25/75 ratio OPC/clinker filter disk. Analysis of the sunflower oil sample spectra highlighted heightened levels of trans-2-alkenals and n-alkenals, consistent with a degree of conversion of elaidic acid to these two aldehydic species. Measured aldehydic levels are quoted in Tables 3-1 and 3-2.

TABLE 3-1

Concentrations of aldehydic components (mmol/kg oil) detected in the $^1$H NMR experiments conducted on a sunflower oil/elaidic acidmixture and used to fry potato chips (concentration units are millimoles)

| Sunflower oil/elaidic acid | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control | 2.7 | 2.3 | 2.0 | 2.0 | 1.7 | 1.2 |
| Day 1 | 9.2 | 14.7 | 2.2 | 2.7 | 3.1 | 4.8 |
| Day 2 | 22.0 | 23.1 | 2.7 | 1.9 | 3.2 | 7.0 |
| Day 3 | 35.9 | 29.7 | 4.8 | 3.5 | 3.7 | 8.7 |
| Day 4 | 50.3 | 33.9 | 5.2 | 3.6 | 3.4 | 19.7 |
| Day 5 | 57.4 | 38.6 | 5.9 | 4.1 | 3.9 | 22.4 |

TABLE 3-2

Concentrations of aldehydic components (mmol/kg oil) detected in the $^1$H NMR experiments on a sunflower oil/elaidic acid mixture, treated with a hydrated OPC/clinker 25/75 disk and used to fry potato chips (concentration units are millimoles)

| Sunflower oil/elaidic acid/disk | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control | 2.3 | 2.0 | 1.6 | 1.7 | 1.4 | 1.4 |
| Day 1 | 3.3 | 7.9 | 1.4 | 1.4 | 2.2 | 1.9 |
| Day 2 | 3.6 | 11.1 | 0.3 | 0.3 | 1.7 | 2.8 |
| Day 3 | 5.6 | 14.4 | 0.9 | 0.7 | 2.5 | 4.7 |
| Day 4 | 11.2 | 28.7 | 1.7 | 0.7 | 5.0 | 12.9 |
| Day 5 | 12.7 | 32.7 | 2.0 | 0.8 | 5.7 | 14.7 |

Figure 10:
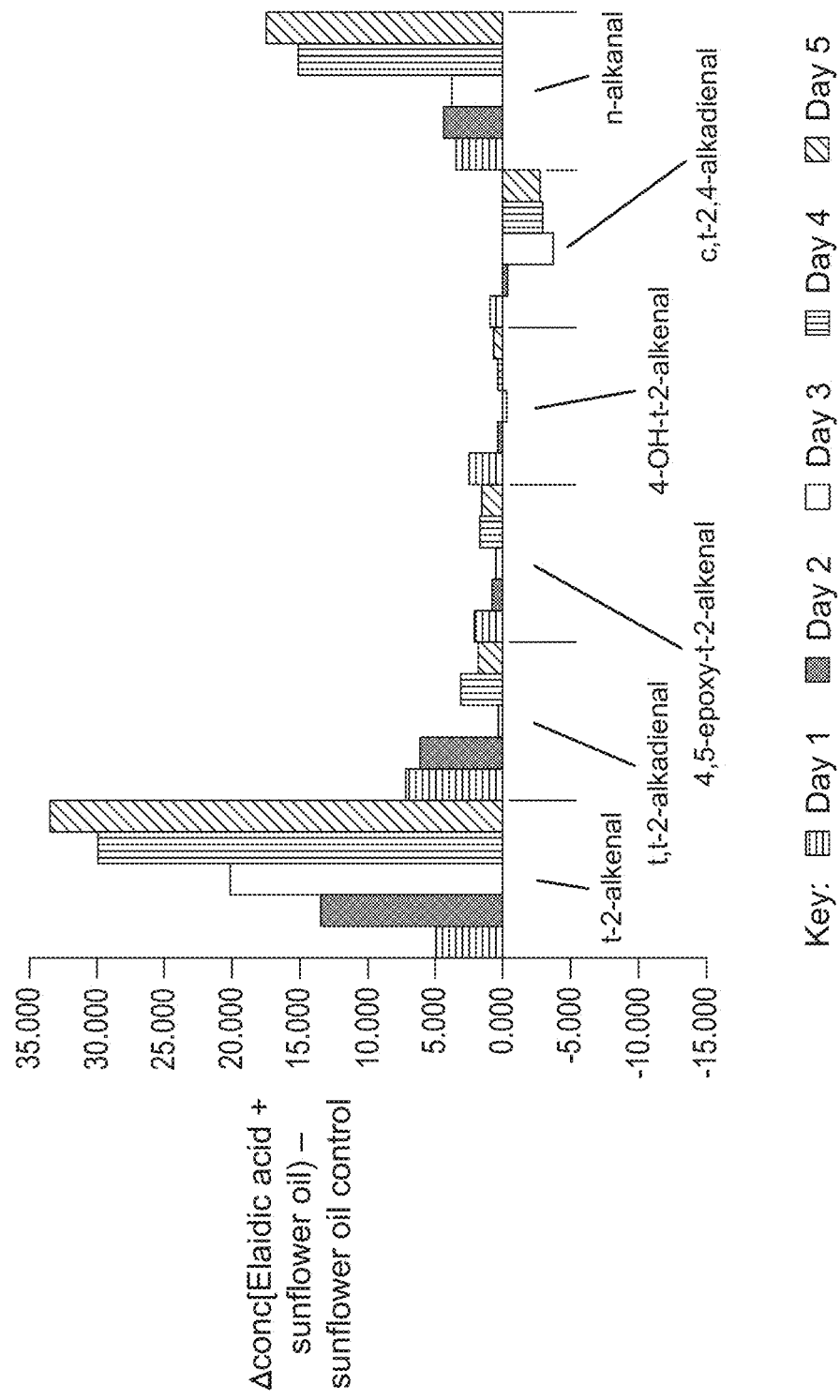

The control values quoted in Tables 3-1 and 3-2 represent the measured aldehydic values in a sample taken from the hot oil immediately after addition of the elaidic acid and thorough mixing of the mixture. Apart from the fact that the two sets of control values are very similar (if not essentially identical), this also implies that oxidation of both bulk oil and elaidic acid is occurring immediately, as the measured values for trans-2-alkenals and n-alkanals are of the same order as those measured for trans, trans-alka-2,4-dienals. All values had the corresponding control sunflower oil values subtracted from them, these differential values being depicted in FIGS. 10 and 11. It can be seen that the trans-2-alkenal and n-alkanal values dominate the results for sunflower oil/elaidic acid but are largely removed when the disk filter is added to the mixture. These results therefore demonstrate, in an indirect manner, that the OPC/clinker filter devices interfere with the oxidative chemistry of trans fats so much that it can be postulated that the deleterious properties of trans fats in vivo may in part be due to the generation of aldehyde lipid oxidation products during cooking procedures.

Example 4

Introduction

A number of further experimental studies have been completed. The experimental protocols of the preceding Examples, performed under "laboratory" conditions, i.e. nominal oil volume within a glass beaker, with/without foodstuff/material have been extended to include use of a commercial double deep fat frying unit, which facilitates direct comparison of studies of control oil versus fried food, control oil versus oil with material sample, material sample versus material sample, etc. (with the proviso of an appropriate material/oil volume ratio scale-up). These studies have been augmented by a consideration of the effect on the various observed experimental analytical parameters of an increased material surface area and/or volume.

An extrapolation of the initial beaker experiments has also involved a comparison of the effect of filtering oil on successive days for a frying episode experiment. Frying experiments have also been repeated with powder-pressed (as opposed to slip cast hydrated) disks so as to validate the beneficial properties of a material that can be produced in batch processes in a more facile manner.

Further tests have been performed so as to gauge the various material porosities and absorption profiles. Porosity, usually described by pore size (as well as its distribution), the quality of pore linkages (and, to a lesser extent, volume fraction) will dictate both the mechanical strength and adsorptive/absorptive properties (permeability) of the finished material product (Alford et al., supra). Absorption profiles for OPC/clinker disks of differing dimensions in both water and heated oil were obtained by weight in order to determine any "initiation" step required for material optimum oil adsorption/absorption design for the commercial sector. These tests included the physical examination of internal profiles through the appropriate sectioning of the various material samples followed by examination under fluorescent light to check for the presence of chromophoric substances. The profile determination also featured an allowance for different "dryness" and drying method for a particular sample.

The previous disk designs were then replaced by a commercial prototype version (FIG. 12a-FIG. 12d). The development of "waffle" style devices 10 (slip-cast and hydrated in specially prepared profiled moulds, Fairey Filtration Systems Ltd) has been a further extension of the studies. The samples employed were cast in profiled moulds nom 150 mm×100 mm×20 mm with 15×20 mm holes 12 perforating them to increase the available surface area and promote good oil circulation when located in real deep-fat fryers. The perforation feature allowed an increase in available surface area and thus promoted good oil circulation when located in a commercial deep-fat flyer. More specifically, the design provides ruggedness and durability coupled with ease of casting. A large draft has been applied to all nominally vertical walls to allow easy removal from moulds without breakage or excessive adhesion. The interstices between adjacent holes provides different thickness solid lands 16 to provide volume with thinner areas 14, while the total surface area created is also significantly larger than a solid cylinder of equivalent volume. The lands 16 between and surrounding the holes 12 play a significant part in trapping polymerization products 18 formed within the devices and preferably have a path length to their centers of 5-50 mm, e.g. 10-30 mm and in an embodiment about 25 mm. The formation of such polymerization products has been determined by UV examination, but UV images of formed polymer are difficult to photograph so that the result is shown by darkened areas in FIG. 12d. Two types of device were employed in the studies, a prototype design and an anticipated production line version (FIGS. 12a-12d). They were tested for efficacy during the now standard five days of frying episodes in the commercial deep fat frying unit. Physical properties of the disc and waffle treatment blocks employed are shown in Table 4.1

TABLE 4.1

| Material type | Mass (g) | Volume ($cm^3$) | Surface area ($cm^2$) | Surface area: Volume |
|---|---|---|---|---|
| 10 mm disk | 19.63 | 19.64 | 54.98 | 2.80 |
| 20 mm disk | 39.27 | 39.27 | 70.69 | 1.80 |
| 40 mm disk | 78.54 | 78.54 | 102.10 | 1.30 |
| waffle - prototype | 204.00 | 203.73 | 483.04 | 2.37 |
| waffle - production | 182.00 | 181.73 | 464.53 | 2.56 |

To extrapolate further from the various experimental analytical parameters obtained from the frying studies, more subtle sensory (and subjective) parameters such as "quality" or "delicacy" of flavour are also required as a metric for device efficiency and, in most cases, can be problematic in terms of realistic and objective performance evaluation. A field trial of the waffle device has therefore been conducted at a well-known "gastropub" establishment where oil samples were acquired over the course of one week's intensive culinary activity for a range of deep-fried foodstuffs prepared using untreated and waffle-treated commercial vegetable oil (thus ensuring a neutral evaluation by industry professional and customer alike, as well as rendering a "blind" assessment for the analytical laboratory.

Materials and Methods

The ability of the various materials to adsorb/absorb the oil-generated free fatty acids (either cis- or trans-isomer) and aldehydic lipid oxidation product (LOP) species were investigated by heating in one of two ways. Firstly, 400 ml samples of oil [corn (maize), soybean, rapeseed, sunflower seed and "refined" olive oil, i.e. a commercially cheaper product in which the natural antioxidant components have been removed from the extra virgin variety, although with no alterations in the initial glyceridic structure] were heated in the presence of atmospheric $O_2$ at 180° C. in a 1 $dm^3$ volume glass beaker (with an internal area of 25 $cm^2$) on an electronic hotplate. Secondly, 6 l of oil was heated in a medium-sized commercial double deep fat frying unit. Where adsorptive/absorptive materials were included in the study, the amount of added material was scaled accordingly. The material was added at the beginning of the experiment, i.e. at the switching on of the heating element, so as to allow for the efficient expulsion of surface/interior material trapped water.

The oil was then allowed to attain an optimum cooking temperature of 180° C. Either 90 g or 400 g (depending on the actual experiment performed) of potato chips was then added to the hot oil and cooked until "brown". The handling of the larger quantity was effected through the use of proprietary wire food baskets. Cooked chips were removed and replaced with fresh chips of the same weight, this being repeated so as to give eight frying episodes per day. A total of five days frying was performed. At the end of each day, a sample of oil was retained and viscosity, pH, colour and $^1H$ NMR spectroscopic measurements were performed.

A typical comparison for a particular vegetable oil comprised the experimental protocol: (a) control oil, (b) oil+1 cm disk, (c) oil+potato chips, (d) oil+1 cm disk+potato chips. The added absorptive materials consisted of either 50 mm diameter 1 cm thickness disks or 50 mm diameter×4 cm thickness cylindrical disks (25% OPC/75% clinker, Fairey Filtration Systems Ltd). The use of either 1 or 4 cm disks (for the deep fat fryer experiments) was necessary in order to examine potentially separate oil incorporation surface area or volume/residency time mechanisms. Although a 4 cm disk provides the same volume (ca. 80 cm$^3$, cf. Table 1), the surface area is considerably reduced (approximately halved) compared to that available with the employment of 4×1 cm discs. Comparisons of 1 and 4 cm disks in the commercial deep fat fryer were conducted in triplicate, with averaged values for the experimental parameters being employed for evaluations. The waffle devices to be tested (dimensions 150×100×20 mm, with 15×20 mm holes) were, as with the disks, immersed in the oil upon commencing heating again to allow for efficient expulsion of trapped water.

In the case of the filtering/non-filtering 1 dm$^3$ beaker experiment, for the filtered oil "half" the sunflower oil was filtered through double-thickness muslin on each morning of the five day experiment (so as to remove particulate matter) and both oil beakers subsequently heated in the normal manner. Powder-pressed disks also comprised the aforementioned 25% OPC/75% clinker composition.

Porosity levels of the various materials were assessed as in Example 1 Absorption profiles of the materials were deduced for both water and heated oil (180° C.) by weighing and subsequently placing samples in the particular medium and reweighing at appropriate designated time intervals (1-10 min. in 1 minute intervals and 5 minute intervals thereafter for the 1 cm disks and 5 minute intervals for the 4 cm disks) thereafter so as to track the interior incorporation of both media. Samples were either "straight from the pack", heated overnight in a furnace at 220° C. (the idea behind the baking being to alleviate any absorption problems associated with hydration effects (Alford 1981)) or lyophilised overnight (Savant Speed Vac Plus freeze drying unit, model no. SC210A, equipped with a Savant Refrigerated Vapor Trap, model no. RVT4104). Separately conducted parallel experiments involved absorption of oil in 1 and 4 cm disks for 2, 4, 8, 12, 16 and 24 hr. time intervals, followed by sectioning in a transverse manner with a diamond saw cutting instrument. Sectioned materials were examined for the interior penetration of oil in either visible, 185 nm or 254 nm fluorescent light and digital photographs taken, where appropriate (although as previously stated these are difficult to reproduce).

Rheology (viscosity) measurements were performed using a Brookfield model DV-1 digital viscometer, equipped with a no. 4 rotor.

pH measurements were performed on the bottom layer of a thoroughly Rotamixed 1:1 mixture of oil sample and reverse osmosis quality water, employing Electric Instruments Ltd pH Meter model 7010 (calibrated with pH 4, 7 and 9 buffer standards on a daily basis, with temperature compensation).

Colour measurements were performed as in Example 1.

$^1$H NMR spectroscopic measurements were conducted on a Bruker Avance 600 MHz NMR spectrometer operating at a frequency of 600.13 MHz and a probe temperature of 298° K. 0.30 ml aliquots of each oil sample were diluted to a volume of 0.80 ml with deuterated chloroform (C$^2$HCl$_3$, 99.8% D, Sigma Aldrich Company, Gillingham, Dorset, UK) which provided a field frequency lock, and the samples placed in 5-mm diameter NMR tubes (Aldrich Series 400 grade, 7 in. L, Sigma Aldrich). The C$^2$HCl$_3$ solvent contained approximately $5 \times 10^{-3}$ mol·dm$^{-3}$ 1,3,5-trichlorobenzene (identified as a singlet resonance at $\delta$=7.227 ppm) which served as a quantitative internal reference standard.

Typical pulsing conditions for the 600 MHz spectrometer included 64 free induction decays (FIDs) using 32,768 data points, acquisition time 3.4079 s, sweep width 9615.38 Hz. Chemical shifts were referenced to residual (protio) chloroform ($\delta$=7.262 ppm). Resonances present in each spectrum were routinely assigned by a consideration of chemical shift values, coupling patterns and coupling constants.

In all NMR experiments, the nature and levels of the various LOPs (trans-2-alkenals, 4-hydroxy-trans-2-alkenals, trans,trans- and cis,trans-alka-2,4-dienals, 4,5-epoxy-trans-2-alkenals and n-alkanals) were determined in the sample solutions. $^1$H NMR assignments, and appropriate chemical shift and coupling constant values of resonances of the various LOP species were confirmed with the HNMR prediction software [version 5.12, Advanced Chemistry Development, Inc. (ACD/Labs), 110 Yonge Street, 14th floor, Toronto, Ontario, Canada M5C 1T4, 2001]. The $^1$H simulations were based around an internal database containing data for >81,000 experimental $^1$H spectra, with the associated algorithms employing intra-molecular interaction parameters for >300 structural fragments and associated sub-algorithms estimating initial values for unique structural fragments. Fragment lists are handled with a modified HOSE (Hierarchical Organisation of Shells Expert)-code which allows for explicit substituent charge and stereo bond conventions, optimizing to the maximal number of spheres. The subsequent quantum mechanical shielding calculations incorporates a consideration of the number of these codes found in the internal database search, as well as the number of those sought. Calculational errors were determined as the standard deviations of the experimental values found within the database. Typically, predicted $^1$H chemical shifts were accurate to within 0.05 ppm and predicted coupling constants were accurate to within 0.2 Hz.

Results/Discussion

The $^1$H NMR spectroscopic results from the heating experiments for all five vegetable oils is summarized in Tables 4.2-4.6. It can be seen that treatment with a 1 cm disk exerts a dramatic reduction in detected aldehyde levels. The results from the 5 day heating experiments involving filtered and non-filtered media highlighted essentially identical values for all four experimental analytical parameters (Table 4.7), suggesting that particulate food matter/debris is not a catalyst for any further oil degradation. Similar results for the $A^{490}$ absorption colour parameter in particular suggests that the complex colour chemistry resulting from the heating of foodstuffs in a medium generating a variety of LOPs has no contribution from any heterogenous matter present, which might have introduced an almost random element to this chemistry, depending on the experimental timepoints/efficacy of degraded foodstuff removal from the oil.

The results of the scale-up from the original beaker experiments to the double deep fat fryer unit for the comparisons of 1 and 4 cm disks (conducted in triplicate and averaged, Table 4.8) demonstrate an equal ability of the two sizes of disk to lower viscosity, but superior properties of four 1 cm disks over one 4 cm disk for the pH and NMR parameters imply that optimum surface area is an important general criterion for the absorption of fatty acids and aldehydes.

The results for the heating experiments conducted on the powder-pressed 1 and 4 cm disks highlighted similar properties for the two disk sizes for viscosity and colour measurements but superior properties of four 1 cm disks over one 4 cm disk for the pH (at least up to day three) and NMR parameters (Table 4.9), again pointing to the importance of surface phenomena.

Results for all types of waffle device with the frying of chips demonstrated acceptable levels of oil viscosity, pH, colour and NMR parameters after 5 days (Table 4.10). The NMR results for the waffle/chips experiment production line version in particular highlighted the lowest levels of detectable aldehydes to date for the double deep fat fryer experiments.

The results from the field trial studies demonstrated the ability of the waffle device to arrest the oil breakdown process as exemplified by reduced viscosity and increased pH values and relatively smaller aldehyde oil levels (Table 4.11).

Results for the various absorption profile experiments are summarized in Tables 4.12-4.13. Whatever the handling method (be it oven baked or freeze-dried), it is clear, from water absorption experiments, that 1 cm disks absorb all possible water molecules after 5 min., this being 15 min. for the 4 cm equivalent; a different absorption profile results for heated oil, as these values increase to 5-10 min. and ≥15 min., respectively. Different implied porosities for the two different media based on their absorption profiles are to be expected due to the essential differences in molecular size between C16-C18 fatty acids and C2-C10 aldehydes and water as well as the nature of the interaction between inorganic and organic group moieties. Small pore-size distributions as well as large void space associated with restrictive channels may make the interior of a material sample inaccessible to a particular medium (Alford 1981). The effect of oven baking disks is to maintain a positive weight increase profile for immersion in heated oil, i.e. no negative "lag phase" whilst all remaining un-bound water molecules are expunged from the disk surface/interior. The success of the application of baking or freeze-drying techniques is essentially limited by pore size as the latter technique does not appear to remove water from the smaller pores (or larger ones linked by small channels (Alford 1981)). Concomitantly the effect of the baking process will be to change the morphology of the material such that, for example, pores will begin to close up or smaller channels between pores may be created which will therefore dictate results for a particular medium.

Absorption experiments conducted in water for powder pressed 1 and 4 cm disks (Tables 4.14-4.15) suggested that the incorporation of water proceeds at a higher rate than "normal" disks (1-2 min. for 1 cm/$H_2O$, ca. 5 min. for 4 cm/$H_2O$), although the oil incorporation is of a similar order to that obtained for the slip cast equivalents. The results are promising as they suggest across the board property enhancements for the OPC/clinker material such that similar general properties are anticipated for the powder pressed disks.

Mechanistically, oil can progress through absorption within the disk and waffle units by two contrasting processes. The first is a surface phenomenon whereby maximum absorption occurs on the fully-exposed outer surface and then gradates to continuously lower degrees of absorption as migration proceeds towards the centre of the interior (which can be thought of as demonstrating an "hourglass" three-dimensional topological profile. The second mechanism involves absorption occurring on a particular part of the material surface (e.g. the centre, where the initial absorption can be concentrated) and then the level of the absorption increases through the interior so as to eventually present an "onion"-like topological profile, reflecting the fact that the medium cannot proceed any further, two opposing migrations eventually coalescing, leading to aggregation phenomena and the possible generation of polymeric units of for example, aldehydes (e.g. through ionic polymerisation processes), this process possibly also being catalysed by the inorganic material itself. Sectioned 1 and 4 cm disks resulting from the absorption time experiments highlighted the formation of "strata" of dark, fluorescent areas (horizontal strips for the cross sections of 1 cm disks, concentric rectangles for the cross sections of 4 cm disks) that reduce to a single, dark, strip or rectangle in the centre of the disks after 12 hr. Such findings may fit the "onion" topology more closely and, hence, the aggregation/polymer formation mechanism. This can be contrasted with the disk and waffle samples recovered from the 5 day frying experiments which demonstrated totally dark, fluorescent interiors after sectioning, indicative of a complete saturation of the units, as well as the completion of any polymerisation processes occurring therein.

Where surface binding phenomena are present, it is anticipated that such adsorption effects may proceed via three types of binding process, i.e. those for (a) free fatty acids, (b) glycerol-bound (core) aldehydes and (c) free aldehydes. Although it has been demonstrated by the NMR spectroscopic analysis of methanolic extracts of heated oil samples that the bulk of aldehydic species will be of the free variety, due to the hydrolytic reactions that generate free fatty acids (and diacylglycerols), which then convert to primary oxidation product hydroperoxydienes by virtue of free radical processes, followed by homolytic β-scission to yield aldehydes, there are nevertheless other LOP species still bound to the glycerol backbone. For example, the 9-hydroperoxydiene of the C18 mono-, di- and triunsaturated C18 fatty acids oleic, linoleic and linolenic acids respectively may generate bound C8:0 and C9:0 aldehydes (and the corresponding bound $C_{9:0}$ acid); the corresponding 8-hydroperoxydiene of oleic acid 13-hydroperoxydiene of linoleic acid is likely to generate C7:0 and C8:0 aldehydes (and $C_{8:0}$ acid). Indeed 9-oxononanoic acid bound to glycerol as its ester is considered to be the major esterified aldehyde in oxidised lipids. The accompanying drawing

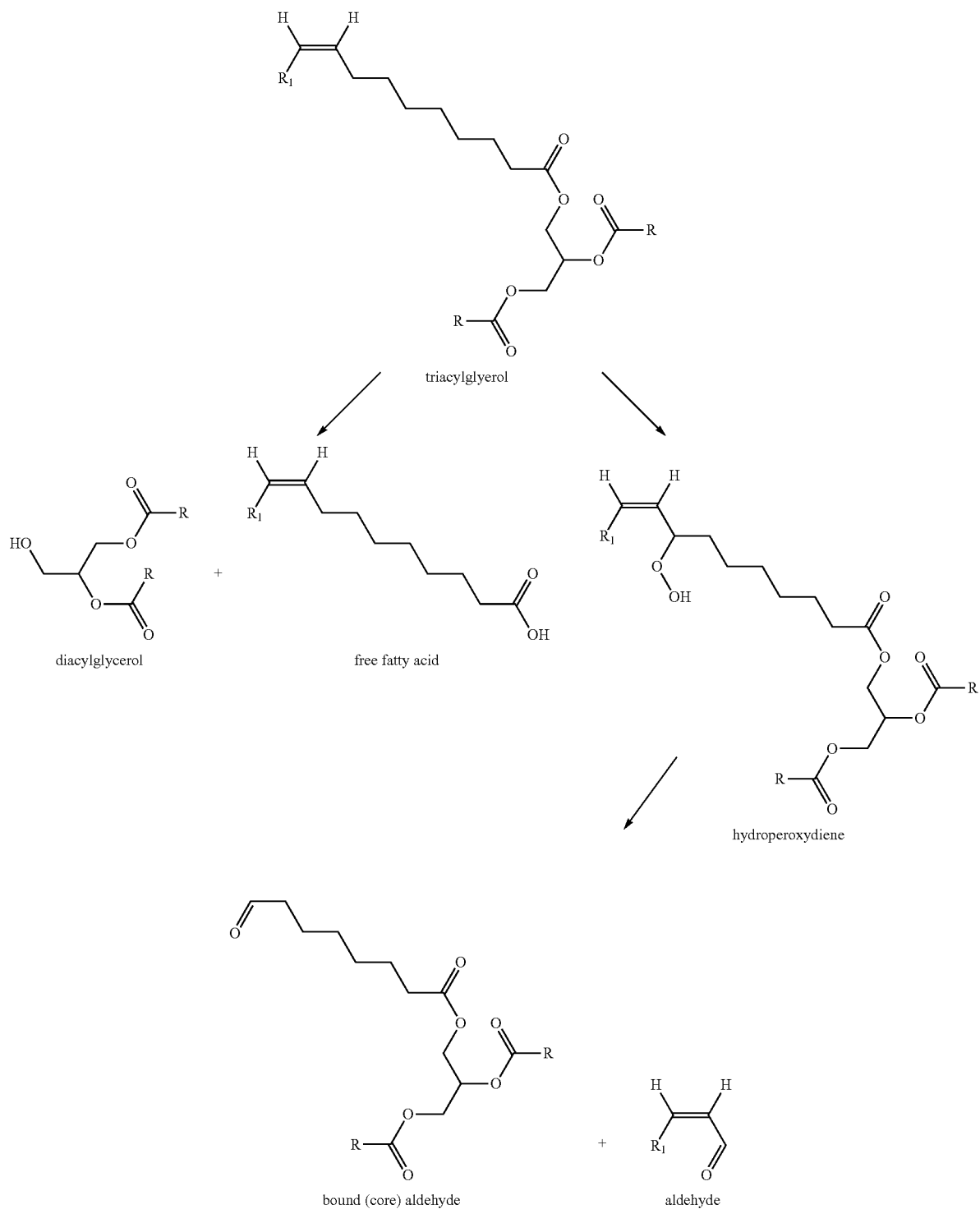
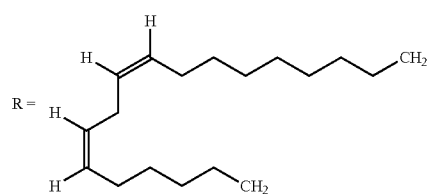

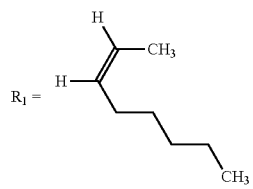

illustrates how the various species may arise from a parent triacylglycerol, the diunsaturated fatty acid linoleic acid being depicted in this particular case. The further figure below depicts the three possible binding modes for various breakdown products. No speculation is made as the nature of any surface binding mechanism as it might involve equally ionic (or partially ionic) and/or non-bonded interactions.

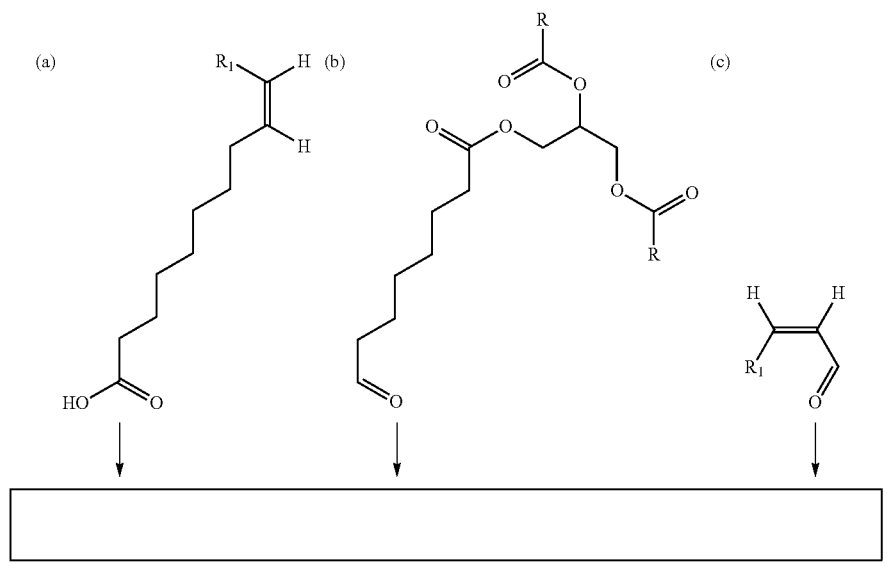

TABLE 4.2

Concentrations of aldehydic components (mmol/kg oil) detected in $^1$H NMR experiments conducted on sunflower oil treated with a hydrated OPC/clinker 25/75 disk and used to fry potato chips.

| Sunflower oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control day 1 | 4.4 | 7.5 | 0.1 | 0.2 | 2.3 | 1.5 |
| Control day 2 | 8.5 | 17.1 | 2.1 | 1.5 | 3.6 | 2.8 |
| Control day 3 | 15.7 | 29.4 | 4.4 | 4.0 | 7.6 | 4.9 |
| Control day 4 | 20.4 | 30.8 | 3.5 | 3.3 | 6.5 | 4.6 |
| Control day 5 | 23.9 | 36.9 | 4.5 | 3.5 | 6.9 | 5.0 |
| Disk day 1 | 1.0 | 1.3 | 0.0 | 0.0 | 0.0 | 0.0 |
| Disk day 2 | 1.7 | 4.4 | 0.0 | 0.6 | 0.7 | 1.0 |
| Disk day 3 | 2.1 | 5.7 | 0.0 | 0.7 | 0.9 | 1.2 |
| Disk day 4 | 2.4 | 6.0 | 0.3 | 0.7 | 1.1 | 2.0 |
| Disk day 5 | 2.9 | 6.5 | 0.0 | 0.4 | 1.4 | 1.2 |
| Chips day 1 | 5.2 | 6.1 | 0.2 | 0.3 | 1.8 | 1.3 |
| Chips day 2 | 9.1 | 16.9 | 2.2 | 1.8 | 3.3 | 2.5 |
| Chips day 3 | 15.5 | 19.8 | 4.9 | 4.1 | 4.8 | 4.4 |
| Chips day 4 | 21.8 | 20.0 | 5.2 | 4.8 | 4.2 | 5.0 |
| Chips day 5 | 27.1 | 23.9 | 5.8 | 5.8 | 3.9 | 5.2 |
| Chips/disk day 1 | 0.5 | 1.1 | 0.0 | 0.0 | 0.5 | 0.1 |
| Chips/disk day 2 | 0.6 | 1.4 | 0.0 | 0.0 | 0.5 | 0.3 |
| Chips/disk day 3 | 1.0 | 2.8 | 0.0 | 0.0 | 0.9 | 0.4 |

TABLE 4.2-continued

Concentrations of aldehydic components (mmol/kg oil) detected in $^1$H NMR experiments conducted on sunflower oil treated with a hydrated OPC/clinker 25/75 disk and used to fry potato chips.

| Sunflower oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Chips/disk day 4 | 1.3 | 3.3 | 0.0 | 0.0 | 0.8 | 0.5 |
| Chips/disk day 5 | 1.6 | 4.7 | 0.0 | 0.0 | 1.2 | 1.2 |

TABLE 4.3

Concentrations of aldehydic components (mmol/kg oil) detected in the $^1$H NMR experiments conducted on soybean oil treated with a hydrated OPC/clinker 25/75 disk (Fairey) and used to fry potato chips.

| Soybean oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control day 1 | 0.2 | 0.4 | 0.0 | n.d. | 0.1 | 0.6 |
| Control day 2 | 1.6 | 3.1 | 0.1 | n.d. | 0.7 | 1.3 |
| Control day 3 | 4.1 | 6.9 | 0.6 | 0.2 | 1.6 | 2.0 |
| Control day 4 | 8.1 | 9.4 | 0.8 | 0.5 | 2.2 | 2.7 |
| Control day 5 | 9.2 | 11.0 | 1.2 | 0.7 | 2.2 | 2.8 |
| Disk day 1 | 0.6 | 0.2 | n.d. | 0.1 | 0.1 | 0.2 |
| Disk day 2 | 1.6 | 2.7 | 0.1 | 0.2 | 0.9 | 1.2 |
| Disk day 3 | 2.4 | 5.2 | 0.2 | 0.4 | 1.2 | 1.8 |
| Disk day 4 | 2.5 | 5.3 | 0.2 | 0.5 | 1.2 | 1.9 |
| Disk day 5 | 2.6 | 5.4 | 0.3 | 0.4 | 1.1 | 1.9 |
| Chips day 1 | n.d. | 0.1 | n.d. | n.d. | 0.2 | 0.4 |
| Chips day 2 | 0.4 | 0.1 | 0.1 | 0.1 | 0.0 | 0.7 |
| Chips day 3 | 0.6 | 1.0 | n.d. | 0.2 | 0.2 | 0.7 |
| Chips day 4 | 0.9 | 1.6 | 0.0 | 0.2 | 0.3 | 0.9 |
| Chips day 5 | 3.2 | 6.6 | 0.4 | 0.3 | 1.6 | 2.4 |
| Chips/disk day 1 | n.d. | n.d. | 0.0 | 0.0 | n.d. | n.d. |
| Chips/disk day 2 | 0.3 | 0.0 | n.d. | 0.1 | 0.0 | 0.5 |
| Chips/disk day 3 | 0.1 | 0.3 | 0.1 | 0.1 | 0.1 | 0.4 |
| Chips/disk day 4 | 0.9 | 1.6 | 0.1 | 0.1 | 0.4 | 1.0 |
| Chips/disk day 5 | 1.9 | 5.1 | 0.1 | 0.1 | 1.4 | 1.7 |

TABLE 4.4

Concentrations of aldehydic components (mmol/kg oil) detected in the $^1$H NMR experiments conducted on rapeseed oil treated with a hydrated OPC/clinker 25/75 disk (Fairey) and used to fry potato chips.

| Rapeseed oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control day 1 | 0.0 | 0.0 | 0.0 | 0.0 | 0.0 | 0.0 |
| Control day 2 | 4.3 | 4.8 | 0.0 | 0.0 | 0.0 | 2.7 |
| Control day 3 | 5.5 | 5.5 | 0.2 | 0.0 | 0.8 | 2.8 |
| Control day 4 | 6.5 | 6.2 | 0.1 | 0.7 | 1.1 | 3.3 |
| Control day 5 | 12.0 | 9.2 | 0.1 | 1.0 | 1.3 | 4.3 |
| Disk day 1 | 0.0 | 0.0 | 0.0 | 0.0 | 0.0 | 0.0 |
| Disk day 2 | 1.1 | 1.7 | 0.0 | 0.0 | 0.1 | 1.2 |
| Disk day 3 | 3.0 | 4.2 | 0.0 | 0.0 | 0.4 | 2.5 |
| Disk day 4 | 5.5 | 4.9 | 0.1 | 0.7 | 1.1 | 3.3 |
| Disk day 5 | 7.4 | 5.6 | 0.4 | 0.6 | 1.4 | 3.4 |
| Chips day 1 | 0.0 | 0.0 | 0.0 | 0.0 | 0.0 | 0.0 |
| Chips day 2 | 0.0 | 0.0 | 0.0 | 0.0 | 0.0 | 0.0 |
| Chips day 3 | 0.0 | 0.0 | 0.0 | 0.0 | 0.0 | 0.0 |
| Chips day 4 | 1.7 | 3.5 | 0.0 | 0.1 | 0.4 | 2.0 |
| Chips day 5 | 8.4 | 7.5 | 0.0 | 0.0 | 0.9 | 5.3 |
| Chips/disk day 1 | 0.0 | 0.0 | 0.0 | 0.0 | 0.0 | 0.0 |
| Chips/disk day 2 | 0.0 | 0.0 | 0.0 | 0.0 | 0.0 | 0.0 |
| Chips/disk day 3 | 0.0 | 0.0 | 0.0 | 0.0 | 0.0 | 0.0 |
| Chips/disk day 4 | 0.2 | 0.8 | 0.0 | 0.0 | 0.1 | 0.4 |
| Chips/disk day 5 | 1.6 | 4.7 | 0.0 | 0.0 | 0.4 | 0.0 |

TABLE 4.5

Concentrations of aldehydic components (mmol/kg oil) detected in the $^1$H NMR experiments conducted on corn oil treated with a hydrated OPC/clinker 25/75 disk (Fairey) and used to fry potato chips.

| Corn oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control day 1 | 0.0 | 0.1 | 0.0 | 0.0 | 0.0 | 0.4 |
| Control day 2 | 0.9 | 1.4 | 0.0 | 0.1 | 0.1 | 0.6 |
| Control day 3 | 2.4 | 4.2 | 0.4 | 0.2 | 0.0 | 1.6 |
| Control day 4 | 5.0 | 6.1 | 0.6 | 1.6 | 1.1 | 2.0 |
| Control day 5 | 5.6 | 7.3 | 0.7 | 0.9 | 0.9 | 2.2 |
| Disk day 1 | 0.0 | 0.0 | 0.0 | 0.0 | 0.0 | 0.2 |
| Disk day 2 | 1.3 | 2.9 | 0.0 | 0.2 | 0.0 | 1.7 |

TABLE 4.5-continued

Concentrations of aldehydic components (mmol/kg oil) detected in the $^1$H NMR experiments conducted on corn oil treated with a hydrated OPC/clinker 25/75 disk (Fairey) and used to fry potato chips.

| Corn oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Disk day 3 | 3.1 | 5.5 | 0.4 | 0.6 | 0.6 | 1.8 |
| Disk day 4 | 6.6 | 8.3 | 0.7 | 1.1 | 1.2 | 2.5 |
| Disk day 5 | 7.1 | 8.7 | 0.8 | 1.6 | 1.6 | 2.8 |
| Chips day 1 | 0.0 | 0.0 | 0.0 | 0.0 | 0.0 | 0.0 |
| Chips day 2 | 0.0 | 0.0 | 0.0 | 0.0 | 0.0 | 0.0 |
| Chips day 3 | 0.0 | 0.0 | 0.0 | 0.0 | 0.0 | 0.0 |
| Chips day 4 | 0.9 | 2.5 | 0.0 | 0.4 | 0.0 | 0.9 |
| Chips day 5 | 2.0 | 4.2 | 0.0 | 0.4 | 0.9 | 1.5 |
| Chips/disk day 1 | 0.0 | 0.0 | 0.0 | 0.0 | 0.0 | 0.0 |
| Chips/disk day 2 | 0.0 | 0.0 | 0.0 | 0.0 | 0.0 | 0.0 |
| Chips/disk day 3 | 0.0 | 0.0 | 0.0 | 0.0 | 0.0 | 0.0 |
| Chips/disk day 4 | 0.1 | 0.2 | 0.0 | 0.0 | 0.0 | 0.0 |
| Chips/disk day 5 | 2.0 | 0.0 | 0.0 | 0.0 | 0.0 | 0.0 |

TABLE 4.6

Concentrations of aldehydic components (mmol/kg oil) detected in the $^1$H NMR experiments conducted on refined olive oil treated with a hydrated OPC/clinker 25/75 disk (Fairey) and used to fry potato chips.

| Refined olive oil | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control day 1 | 0.5 | 0.0 | 0.0 | 0.0 | 0.0 | 1.6 |
| Control day 2 | 1.2 | 0.0 | 0.0 | 0.0 | 0.0 | 1.8 |
| Control day 3 | 3.7 | 1.3 | 0.3 | 0.1 | 0.0 | 1.8 |
| Control day 4 | 6.0 | 2.0 | 0.0 | 0.0 | 0.0 | 2.3 |
| Control day 5 | 7.6 | 2.2 | 0.2 | 0.0 | 0.0 | 2.5 |
| Disk day 1 | 0.7 | 0.0 | 0.0 | 0.0 | 0.0 | 1.6 |
| Disk day 2 | 1.2 | 0.8 | 0.0 | 0.1 | 0.1 | 1.7 |
| Disk day 3 | 1.8 | 1.0 | 0.0 | 0.0 | 0.0 | 1.8 |
| Disk day 4 | 2.2 | 1.3 | 0.0 | 0.0 | 0.0 | 2.2 |
| Disk day 5 | 2.5 | 0.0 | 0.0 | 0.0 | 0.0 | 2.5 |
| Chips day 1 | 1.1 | 0.0 | 0.0 | 0.0 | 0.0 | 3.5 |
| Chips day 2 | 0.0 | 0.0 | 0.0 | 0.0 | 0.0 | 1.8 |
| Chips day 3 | 0.9 | 0.0 | 0.0 | 0.1 | 0.0 | 2.0 |
| Chips day 4 | 1.1 | 0.0 | 0.0 | 0.0 | 0.0 | 2.0 |
| Chips day 5 | 1.1 | 0.6 | 0.0 | 0.0 | 0.0 | 2.1 |
| Chips/disk day 1 | 0.9 | 0.0 | 0.0 | 0.0 | 0.0 | 2.4 |
| Chips/disk day 2 | 0.7 | 0.0 | 0.0 | 0.0 | 0.0 | 1.6 |
| Chips/disk day 3 | 1.1 | 0.0 | 0.0 | 0.0 | 0.0 | 2.0 |
| Chips/disk day 4 | 1.0 | 0.0 | 0.0 | 0.0 | 0.0 | 2.6 |
| Chips/disk day 5 | 1.0 | 0.7 | 0.0 | 0.0 | 0.0 | 2.1 |

TABLE 4.7

Frying experiments conducted in sunflower oil for "standard" OPC/clinker 25/75 1 cm disks, used to fry chips, the oil being non-filtered or filtered on a daily basis.

| | non-filtered | filtered |
|---|---|---|
| (a) viscosities (mPa · s) | | |
| Day 1 | 70 | 70 |
| Day 2 | 72 | 72 |
| Day 3 | 76 | 75 |
| Day 4 | 79 | 80 |
| Day 5 | 82 | 82 |
| Day 6 | 93 | 92 |
| Day 7 | 93 | 94 |
| Day 8 | 95 | 95 |
| Day 9 | 95 | 96 |
| Day 10 | 96 | 96 |
| Day 11 | 97 | 96 |
| Day 12 | 96 | 95 |
| Day 13 | 97 | 96 |
| Day 14 | 96 | 96 |
| (b) pH values | | |
| Day 1 | 6.0 | 6.0 |
| Day 2 | 6.0 | 5.9 |
| Day 3 | 5.8 | 5.8 |
| Day 4 | 5.8 | 5.8 |
| Day 5 | 5.7 | 5.8 |
| Day 6 | 5.6 | 5.6 |
| Day 7 | 5.6 | 5.6 |
| Day 8 | 5.5 | 5.6 |
| Day 9 | 5.5 | 5.5 |
| Day 10 | 5.5 | 5.5 |
| Day 11 | 5.5 | 5.5 |
| Day 12 | 5.4 | 5.5 |
| Day 13 | 5.5 | 5.5 |
| Day 14 | 5.5 | 5.5 |
| (c) colour | | |
| Day 1 | 0.02 | 0.02 |
| Day 2 | 0.08 | 0.07 |
| Day 3 | 0.13 | 0.13 |
| Day 4 | 0.17 | 0.15 |
| Day 5 | 0.25 | 0.28 |
| Day 6 | 0.26 | 0.28 |
| Day 7 | 0.30 | 0.31 |
| Day 8 | 0.34 | 0.37 |
| Day 9 | 0.36 | 0.37 |
| Day 10 | 0.38 | 0.38 |
| Day 11 | 0.38 | 0.38 |
| Day 12 | 0.39 | 0.38 |

TABLE 4.7-continued

Frying experiments conducted in sunflower oil for "standard" OPC/clinker 25/75 1 cm disks, used to fry chips, the oil being non-filtered or filtered on a daily basis.

| | | |
|---|---|---|
| Day 13 | 0.41 | 0.40 |
| Day 14 | 0.40 | 0.40 |

(d) NMR spectroscopy (mmol/kg)

| | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| non-filtered | | | | | | |
| Day 1 | 0.3 | 0.5 | 0.0 | 0.0 | 0.1 | 0.0 |
| Day 2 | 0.5 | 0.4 | 0.0 | 0.0 | 0.0 | 0.0 |
| Day 3 | 0.6 | 0.7 | 0.0 | 0.0 | 0.0 | 0.0 |
| Day 4 | 0.5 | 1.1 | 0.0 | 0.1 | 0.0 | 0.0 |
| Day 5 | 0.8 | 2.1 | 0.0 | 0.1 | 0.0 | 0.3 |
| Day 6 | 1.1 | 3.6 | 0.0 | 0.3 | 0.6 | 0.7 |
| Day 7 | 1.2 | 4.4 | 0.0 | 0.1 | 0.9 | 1.0 |
| Day 8 | 1.3 | 4.4 | 0.0 | 0.0 | 1.2 | 1.3 |
| Day 9 | 2.1 | 6.6 | 0.0 | 0.0 | 1.1 | 1.7 |
| Day 10 | 2.7 | 6.9 | 0.0 | 0.0 | 1.5 | 2.3 |
| Day 11 | 2.9 | 6.8 | 0.2 | 0.2 | 1.3 | 2.5 |
| Day 12 | 3.2 | 7.3 | 0.0 | 0.0 | 1.3 | 2.6 |
| Day 13 | 3.6 | 8.7 | 0.0 | 0.0 | 1.5 | 3.2 |
| Day 14 | 4.0 | 9.0 | 0.0 | 0.0 | 1.8 | 3.5 |
| filtered | | | | | | |
| Day 1 | 0.5 | 0.4 | 0.0 | 0.0 | 0.0 | 0.0 |
| Day 2 | 0.5 | 0.4 | 0.0 | 0.0 | 0.1 | 0.2 |
| Day 3 | 0.5 | 0.4 | 0.0 | 0.0 | 0.0 | 0.4 |
| Day 4 | 0.8 | 1.8 | 0.0 | 0.0 | 0.1 | 0.0 |
| Day 5 | 0.9 | 2.2 | 0.0 | 0.0 | 0.0 | 0.0 |
| Day 6 | 1.7 | 3.7 | 0.1 | 0.1 | 0.1 | 1.1 |
| Day 7 | 1.9 | 4.4 | 0.0 | 0.3 | 0.7 | 1.3 |
| Day 8 | 2.0 | 4.5 | 0.0 | 0.0 | 1.1 | 1.3 |
| Day 9 | 2.3 | 6.4 | 0.5 | 0.7 | 1.1 | 1.6 |
| Day 10 | 2.8 | 6.8 | 0.0 | 0.0 | 1.1 | 2.3 |
| Day 11 | 2.9 | 6.8 | 0.2 | 0.2 | 1.3 | 2.6 |
| Day 12 | 3.2 | 7.0 | 0.0 | 0.0 | 1.3 | 2.6 |
| Day 13 | 3.5 | 8.7 | 0.0 | 0.0 | 1.7 | 3.4 |
| Day 14 | 4.0 | 9.1 | 0.0 | 0.0 | 2.0 | 3.5 |

TABLE 4.8

Frying experiments conducted in a commercial double deep fat fryer, for sunflower oil treated with a hydrated OPC/clinker 25/75 disk and used to fry potato chips.

| | Control | Chips | 4 × 1 cm disks 1 | 4 × 1 cm disks 2 | 4 × 1 cm disks 3 | 1 × 4 cm disk 1 | 1 × 4 cm disk 2 | 1 × 4 cm disk 3 | 4 × 1 cm disks ave | 1 × 4 cm disk ave |
|---|---|---|---|---|---|---|---|---|---|---|
| (a) viscosities (mPa · s) | | | | | | | | | | |
| Day 1 | 90 | 78 | 80 | 80 | 80 | 80 | 80 | 80 | 80 | 80 |
| Day 2 | 104 | 82 | 86 | 80 | 86 | 82 | 78 | 82 | 84 | 81 |
| Day 3 | 110 | 86 | 92 | 82 | 86 | 88 | 78 | 84 | 87 | 83 |
| Day 4 | 136 | 106 | 102 | 102 | 92 | 98 | 92 | 92 | 99 | 94 |
| Day 5 | 160 | 118 | 120 | 118 | 110 | 108 | 108 | 112 | 116 | 113 |
| (b) pH values | | | | | | | | | | |
| Day 1 | 4.6 | 4.6 | 5.8 | 5.3 | 5.8 | 5.1 | 5.6 | 5.8 | 5.6 | 5.7 |
| Day 2 | 4.5 | 4.6 | 5.4 | 5.0 | 5.5 | 4.8 | 4.6 | 5.6 | 5.3 | 5.0 |
| Day 3 | 4.4 | 4.6 | 4.6 | 4.9 | 5.4 | 4.7 | 4.6 | 5 | 5.0 | 4.8 |
| Day 4 | 4.4 | 4.5 | 4.6 | 4.8 | 4.8 | 4.6 | 4.4 | 4.9 | 4.7 | 4.6 |
| Day 5 | 4.4 | 4.4 | 4.6 | 4.6 | 4.7 | 4.5 | 4.4 | 4.8 | 4.6 | 4.6 |

| | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| (c) NMR spectroscopy (mmol/kg) | | | | | | |
| Double deep fat fryer control | | | | | | |
| Day 1 | 1.6 | 3.2 | 0.0 | 0.4 | 0.7 | 1.3 |
| Day 2 | 2.3 | 6.4 | 0.3 | 0.6 | 1.4 | 1.8 |
| Day 3 | 4.6 | 9.5 | 0.5 | 0.4 | 1.7 | 3.3 |
| Day 4 | 5.9 | 10.8 | 0.6 | 0.7 | 1.8 | 3.9 |
| Day 5 | 8.8 | 12.9 | 0.7 | 1.1 | 2.2 | 5.6 |
| Double deep fat fryer chips | | | | | | |
| Day 1 | 4.1 | 8.6 | 0.1 | 0.7 | 1.4 | 2.5 |
| Day 2 | 4.2 | 10.2 | 0.5 | 0.7 | 1.7 | 3.6 |
| Day 3 | 4.8 | 11.1 | 0.4 | 1.1 | 1.9 | 3.7 |
| Day 4 | 10.2 | 13.4 | 0.6 | 1.2 | 2.6 | 7.0 |
| Day 5 | 10.7 | 12.2 | 0.9 | 1.3 | 1.7 | 6.9 |
| Double deep fat fryer chips, 4 × 1 cm disks average | | | | | | |
| Day 1 | 1.3 | 2.2 | 0.0 | 0.0 | 0.2 | 0.9 |
| Day 2 | 1.1 | 2.0 | 0.0 | 0.0 | 0.1 | 0.9 |
| Day 3 | 1.8 | 4.9 | 0.1 | 0.2 | 0.8 | 1.1 |
| Day 4 | 2.1 | 5.0 | 0.1 | 0.3 | 0.9 | 1.4 |
| Day 5 | 3.0 | 7.0 | 0.3 | 0.5 | 1.4 | 2.1 |

TABLE 4.8-continued

Frying experiments conducted in a commercial double deep fat fryer, for sunflower oil treated with a hydrated OPC/clinker 25/75 disk and used to fry potato chips.

Double deep fat fryer chips, 1 × 4 cm disks average

| | | | | | | |
|---|---|---|---|---|---|---|
| Day 1 | 3.0 | 7.0 | 0.1 | 0.6 | 1.5 | 2.1 |
| Day 2 | 3.6 | 8.1 | 0.4 | 0.5 | 1.5 | 2.4 |
| Day 3 | 3.8 | 8.9 | 0.5 | 0.6 | 1.4 | 2.6 |
| Day 4 | 4.0 | 9.0 | 0.5 | 0.4 | 1.4 | 3.0 |
| Day 5 | 5.7 | 10.7 | 0.6 | 0.9 | 1.9 | 3.0 |

TABLE 4.9

Deep fat frying experiments conducted in sunflower oil for both 1 and 4 cm powder-pressed OPC/clinker disks.

| | powder-pressed 4 × 1 cm disks | powder-pressed 1 × 4 cm disk |
|---|---|---|
| (a) viscosities (mPa · s) | | |
| Day 1 | 81 | 80 |
| Day 2 | 84 | 84 |
| Day 3 | 90 | 87 |
| Day 4 | 100 | 99 |
| Day 5 | 118 | 118 |
| (b) pH values | | |
| Day 1 | 5.7 | 5.7 |
| Day 2 | 5.3 | 4.9 |
| Day 3 | 4.7 | 4.7 |
| Day 4 | 4.5 | 4.6 |
| Day 5 | 4.5 | 4.5 |

(c) NMR spectroscopy (mmol/kg sunflower oil)

| | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| powder-pressed 4 × 1 cm disks | | | | | | |
| Day 1 | 1.1 | 1.3 | 0.0 | 0.0 | 0.0 | 1.6 |
| Day 2 | 1.3 | 2.8 | 0.0 | 0.0 | 0.0 | 1.9 |
| Day 3 | 1.3 | 3.9 | 0.0 | 0.0 | 0.0 | 2.3 |
| Day 4 | 2.3 | 5.6 | 0.0 | 0.0 | 1.1 | 2.7 |
| Day 5 | 2.8 | 6.8 | 0.0 | 0.0 | 1.2 | 4.4 |
| powder-pressed 1 × 4 cm disk | | | | | | |
| Day 1 | 0.6 | 3.4 | 0.0 | 0.0 | 0.0 | 1.4 |
| Day 2 | 2.0 | 5.0 | 0.0 | 0.0 | 0.0 | 2.3 |
| Day 3 | 2.5 | 6.0 | 0.0 | 0.0 | 0.7 | 2.4 |
| Day 4 | 3.2 | 8.0 | 0.0 | 0.0 | 1.1 | 3.4 |
| Day 5 | 4.0 | 8.7 | 0.0 | 0.0 | 1.4 | 5.3 |

TABLE 4.10

Frying experiments conducted in sunflower oil for a production line "waffle" device, used as either control or with chips.

| | waffle control | waffle chips |
|---|---|---|
| (a) viscosities (mPa · s) | | |
| Day 1 | 98 | 98 |
| Day 2 | 98 | 98 |
| Day 3 | 100 | 98 |
| Day 4 | 100 | 100 |
| Day 5 | 100 | 100 |
| (b) pH values | | |
| Day 1 | 6.2 | 6.2 |
| Day 2 | 6.2 | 5.8 |

TABLE 4.10-continued

Frying experiments conducted in sunflower oil for a production line "waffle" device, used as either control or with chips.

| | | |
|---|---|---|
| Day 3 | 6.1 | 5.8 |
| Day 4 | 6.1 | 5.7 |
| Day 5 | 6.1 | 5.5 |

(c) NMR spectroseopy (mmol/kg sunflower oil)

| | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| waffle control | | | | | | |
| Day 1 | 0.8 | 1.5 | 0.0 | 0.0 | 0.0 | 0.7 |
| Day 2 | 1.1 | 2.6 | 0.0 | 0.0 | 0.0 | 1.1 |
| Day 3 | 1.1 | 3.0 | 0.0 | 0.0 | 0.0 | 1.6 |
| Day 4 | 1.3 | 4.0 | 0.0 | 0.0 | 0.8 | 2.1 |
| Day 5 | 1.4 | 4.8 | 0.0 | 0.0 | 0.0 | 2.8 |
| waffle chips | | | | | | |
| Day 1 | 0.7 | 1.3 | 0.0 | 0.0 | 0.0 | 0.0 |
| Day 2 | 0.8 | 1.9 | 0.0 | 0.0 | 0.0 | 1.1 |
| Day 3 | 2.0 | 4.5 | 0.0 | 0.0 | 0.5 | 2.2 |
| Day 4 | 2.1 | 6.1 | 0.0 | 0.0 | 0.8 | 3.5 |
| Day 5 | 2.2 | 4.4 | 0.0 | 0.0 | 0.0 | 5.0 |

TABLE 4.11

Frying experiments conducted in the first field trial, employing a commercial vegetable oil and a production line "waffle" device.

| | control food | waffle food |
|---|---|---|
| (a) viscosities (mPa · s) | | |
| Day 1 | 88 | 88 |
| Day 2 | 92 | 88 |
| Day 3 | 96 | 94 |
| Day 4 | 96 | 94 |
| Day 5 | 96 | 94 |
| Day 6 | 100 | 96 |
| Day 7 | 102 | 98 |
| (b) pH values | | |
| Day 1 | 5.6 | 5.8 |
| Day 2 | 4.6 | 5.1 |
| Day 3 | 4.4 | 5 |
| Day 4 | 4.4 | 5 |
| Day 5 | 4.4 | 5 |
| Day 6 | 4.4 | 5 |
| Day 7 | 4.2 | 5 |

(c) NMR spectroscopy (mmol/kg oil)

| | trans-2-alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| control food | | | | | | |
| Day 1 | 0.0 | 0.0 | 0.0 | 0.0 | 0.0 | 0.0 |
| Day 2 | 0.0 | 1.0 | 0.0 | 0.0 | 0.0 | 0.0 |
| Day 3 | 0.3 | 2.0 | 0.0 | 0.0 | 0.0 | 0.1 |
| Day 4 | 0.5 | 1.8 | 0.0 | 0.0 | 0.0 | 0.7 |
| Day 5 | 0.9 | 2.0 | 0.0 | 0.0 | 0.0 | 0.8 |
| Day 6 | 1.2 | 2.7 | 0.0 | 0.0 | 0.0 | 1.7 |
| Day 7 | 1.5 | 3.0 | 0.0 | 0.0 | 0.5 | 1.9 |
| waffle food | | | | | | |
| Day 1 | 0.0 | 0.0 | 0.0 | 0.0 | 0.0 | 0.0 |
| Day 2 | 0.0 | 0.9 | 0.0 | 0.0 | 0.0 | 0.0 |
| Day 3 | 0.0 | 1.5 | 0.0 | 0.0 | 0.0 | 0.1 |
| Day 4 | 0.6 | 1.4 | 0.0 | 0.0 | 0.0 | 0.9 |
| Day 5 | 0.9 | 1.5 | 0.0 | 0.0 | 0.0 | 1.2 |
| Day 6 | 1.4 | 1.8 | 0.0 | 0.0 | 0.0 | 2.0 |
| Day 7 | 1.1 | 2.5 | 0.0 | 0.0 | 0.0 | 1.5 |

TABLE 4.12

Absorptivity tests conducted on hydrated 25/75 OPC/clinker 1 cm disks.[a] Alternate columns refer to time (min.) and weight difference (g).

| A | A | B | B | C | C | D | D | E | E |
|---|---|---|---|---|---|---|---|---|---|
| 0 | 0.0000 | 0 | 0.0000 | 0 | 0.0000 | 0 | 0.0000 | 0 | 0 |
| 1 | 1.9970 | 1 | 2.0097 | 1 | −0.6131 | 10 | 2.2610 | 5 | −3.9011 |
| 2 | 3.2270 | 2 | 4.0373 | 2 | −1.2759 | 20 | 3.1268 | 10 | −3.9305 |
| 3 | 3.5568 | 3 | 5.2820 | 3 | −1.6779 | 30 | 3.6048 | 15 | −3.5597 |
| 4 | 3.7045 | 4 | 6.1455 | 4 | −1.4184 | 40 | 4.0547 | 20 | −3.1082 |
| 5 | 3.8084 | 5 | 6.9450 | 5 | −1.7035 | 50 | 4.3013 | 25 | −2.6305 |
| 6 | 3.8423 | 10 | 7.6488 | 6 | −1.8654 | 60 | 4.5773 | 30 | −2.3134 |
| 7 | 3.9041 | 15 | 7.9461 | 7 | −2.0743 | 120 | 5.8315 | | |
| 8 | 3.9332 | 20 | 7.9885 | 8 | −2.1101 | 240 | 5.7729 | | |
| 9 | 3.9870 | | | 9 | −2.0526 | 480 | 5.9801 | | |
| 10 | 4.0305 | | | 10 | −2.0826 | 720 | 5.9152 | | |
| 15 | 4.1222 | | | 15 | −2.5095 | | | | |
| 20 | 4.1169 | | | 20 | −2.2322 | | | | |
| 25 | 4.1192 | | | 26 | −1.9634 | | | | |
| 30 | 4.1381 | | | 34 | −1.8003 | | | | |
| | | | | 52 | −1.7843 | | | | |
| | | | | 90 | −0.5970 | | | | |
| | | | | 120 | −0.7627 | | | | |
| | | | | 150 | −0.6712 | | | | |
| | | | | 180 | −0.6350 | | | | |
| | | | | 210 | −0.6078 | | | | |
| | | | | 240 | −0.5872 | | | | |
| | | | | 270 | −0.5022 | | | | |
| | | | | 300 | −0.5215 | | | | |

TABLE 4.12-continued

Absorptivity tests conducted on hydrated 25/75 OPC/clinker 1 cm disks.[a] Alternate columns refer to time (min.) and weight difference (g).

| A | A | B | B | C | C | D | D | E | E |
|---|---|---|---|---|---|---|---|---|---|
|   |   |   |   | 330 | −0.4523 |   |   |   |   |
|   |   |   |   | 360 | −0.5469 |   |   |   |   |
|   |   |   |   | 390 | −0.4798 |   |   |   |   |

[a]key: A—baked disk placed in water, B—freeze-dried disk placed in water, C—disk placed in heated oil, D—baked disk placed in heated oil, E—freeze-dried disk placed in heated oil.

TABLE 4.13

Absorptivity tests conducted on hydrated 25/75 OPC/clinker 4 cm disks.[a] Alternate columns refer to time (min.) and weight difference (g)

| A | A | B | B | C | C | D | D | E | E |
|---|---|---|---|---|---|---|---|---|---|
| 0 | 0.0000 | 0 | 0 | 0 | −4.38513 | 0 | 0.0000 | 0 | 0 |
| 5 | 6.6441 | 5 | 8.7891 | 10 | −5.78563 | 10 | 8.1439 | 10 | −11.4435 |
| 10 | 8.7856 | 10 | 10.7135 | 20 | −7.62845 | 20 | 10.9982 | 20 | −15.4142 |
| 15 | 9.9738 | 15 | 11.3399 | 50 | −5.0185 | 30 | 12.7183 | 30 | −15.9082 |
| 20 | 10.8072 | 20 | 11.3672 | 80 | −4.18118 | 40 | 13.7877 |   |   |
| 25 | 10.9760 | 25 | 11.3533 | 110 | −3.8552 | 50 | 14.4636 |   |   |
| 30 | 11.2636 | 30 | 11.4395 | 140 | −0.57455 | 60 | 14.9990 |   |   |
|   |   |   |   | 180 | −0.10455 | 120 | 17.7230 |   |   |
|   |   |   |   | 220 | −0.05293 | 240 | 18.2717 |   |   |
|   |   |   |   | 250 | −1.31103 | 480 | 19.4056 |   |   |
|   |   |   |   | 280 | −1.55235 | 720 | 20.1682 |   |   |
|   |   |   |   | 325 | −1.76705 |   |   |   |   |
|   |   |   |   | 355 | −1.81242 |   |   |   |   |
|   |   |   |   | 385 | −1.77063 |   |   |   |   |
|   |   |   |   | 415 | −1.74482 |   |   |   |   |
|   |   |   |   | 445 | −4.38513 |   |   |   |   |

[a]key: A—baked disk placed in water, B—freeze-dried disk placed in water, C—disk placed in heated oil, D—baked disk placed in heated oil, E—freeze-dried disk placed in heated oil.

TABLE 4.14

Absorptivity tests conducted on powder-pressed 25/75 OPC/clinker 1 cm disks.[a] Alternate columns refer to time (min.) and weight difference (g).

| A | A | B | B |
|---|---|---|---|
| 0 | 0.0000 | 0 | 0.0000 |
| 1 | 6.3501 | 1 | 1.7509 |
| 2 | 6.6312 | 2 | 2.6204 |
| 3 | 6.6750 | 3 | 3.3394 |
| 4 | 6.6773 | 4 | 3.9967 |
| 5 | 6.7376 | 5 | 4.3010 |
| 6 | 6.7123 | 6 | 4.6193 |
| 7 | 6.7066 | 7 | 4.9636 |
| 8 | 6.7042 | 8 | 5.2334 |
| 9 | 6.7051 | 9 | 5.5237 |
| 10 | 6.7070 | 10 | 5.8113 |
| 15 | 6.6978 | 14 | 6.7197 |
| 20 | 6.7062 | 19 | 7.6764 |
| 25 | 6.6996 | 24 | 8.5163 |
| 30 | 6.6939 | 29 | 9.3522 |

[a]key: A—baked disk placed in water, B—baked disk placed in heated oil.

TABLE 4.15

Absorptivity tests conducted on powder-pressed 25/75 OPC/clinker 4 cm disks.[a] Alternate columns refer to time (min.) and weight difference (g).

| A | A | B | B |
|---|---|---|---|
| 0 | 0.0000 | 0 | 0.0000 |
| 5 | 18.8223 | 4 | 5.7594 |
| 10 | 19.8028 | 14 | 9.1854 |
| 15 | 20.6318 | 19 | 11.0734 |
| 20 | 21.4394 | 24 | 12.7426 |
| 25 | 22.3072 | 29 | 14.4936 |
| 30 | 23.1446 |   |   |

[a]key: A—baked disk placed in water, B—baked disk placed in heated oil.

The invention claimed is:

1. A hydraulically set oil-permeable article comprising,
a cement body enclosed in a package that resists ingress of water or water vapor, wherein the cement body is a block or briquette for preserving cooking oil during deep fat frying,
said cement body consisting of:
greater than 50 wt % of a mixture of milled white ordinary Portland cement (OPC) clinker and white ordinary Portland cement in which the milled white OPC clinker is present in an amount of less than or equal to 15 wt % of the mixture,
having no free water for resisting damage on immersion in cooking oil and initial heating,
optionally further consisting of silica 1-2 wt % and/or titanium dioxide 1-2 wt % and
optionally further consisting of ingredients selected from calcium silicate, magnesium silicate, aluminium silicate, natural feldspars, natural sodium zeolites, natural calcium zeolites, synthetic sodium zeolites, synthetic calcium zeolites, wollastonite, calcium hydroxide, clays, pillared clays, activated clays/earths, talcs/kaolinite, amphiboles, granite porphyry, rhyolite, agahnatolite, porphyry, attapulgite and diatomaceous earth; and wherein the cement body is porous so that oil can diffuse into it and contaminants can be deposited on and within it.

2. The article of claim 1, wherein the block or briquette consists only of white OPC, clinker milled to an average particle size of 10-50 μm and white ordinary Portland cement.

3. The article of claim 1, wherein the block or briquette consists only of white OPC clinker and white ordinary Portland cement.

4. The article of claim 1, wherein the block or briquette is an apertured stand-alone block.

5. The article of claim 1, wherein the block or briquette has a porosity estimable from the difference between its water-saturated and dry weights of 20-55%.

6. The article of claim 1, wherein the package comprises a pouch or container of film or sheet selected from the group consisting of polyethylene, polypropylene, polyethylene terephthalate and metallized plastics.

7. The article of claim 1, wherein the package comprises a vacuum pack comprising a pouch or container of film or sheet selected from the group consisting of polyethylene, polypropylene, polyethylene terephthalate and metallized plastics.

8. The article of claim 1, wherein the block or briquette has a mass of 150-500 g.

9. The article of claim 1, wherein the block or briquette has a mass of 250-350 g.

10. The article of claim 1, wherein the block or briquette is a generally planar article.

11. The article of claim 10, wherein the block or briquette has a volume to surface area ratio of from 0.3:1 to 0.45:1.

12. A hydraulically set oil-permeable article comprising,
a cement body enclosed in a package that resists ingress of water or water vapor, wherein the cement body is in the form of a stand-alone block or briquette for preserving cooking oil during deep fat frying,
said cement body consisting of 100 wt % of a mixture of milled white ordinary Portland cement (OPC) clinker of average particle size of 10-50 μm and white ordinary Portland cement, in which the milled white OPC clinker is present in an amount of less than or equal to 15 wt % of the mixture, and optionally with silica 1-2 wt % and/or titanium dioxide at 1-2 wt % and having no free water for resisting damage on immersion in cooking oil and initial heating; and
the package comprises a film or sheet selected from the group consisting of polyethylene, polypropylene, polyethylene terephthalate and metallized plastics;
the body having the properties that calcium and magnesium substantially do not leach into the oil and that it is porous so that oil can diffuse into it and contaminants can be deposited on and within it.

* * * * *